(12) United States Patent
Maercovich

(10) Patent No.: US 8,596,606 B2
(45) Date of Patent: Dec. 3, 2013

(54) AUTOMATE FLUID FLOW CONTROL SYSTEM

(76) Inventor: Jorge Maercovich, Woodland Hills, CA (US)

( * ) Notice: Subject to any disclaimer, the term of this patent is extended or adjusted under 35 U.S.C. 154(b) by 0 days.

(21) Appl. No.: 12/932,110

(22) Filed: Feb. 16, 2011

(65) Prior Publication Data
US 2011/0139256 A1    Jun. 16, 2011

Related U.S. Application Data

(63) Continuation-in-part of application No. 12/460,371, filed on Jul. 16, 2009, now Pat. No. 8,087,636, which is a continuation of application No. 11/525,769, filed on Sep. 22, 2006, now Pat. No. 7,681,860.

(51) Int. Cl.
*F16K 31/12*    (2006.01)

(52) U.S. Cl.
USPC .............. 251/30.04; 251/38; 251/45; 251/65

(58) Field of Classification Search
USPC ................. 251/30.01–30.05, 58, 59, 229, 251/251–255, 256, 263, 129.11, 337, 321, 251/318
See application file for complete search history.

(56) References Cited

U.S. PATENT DOCUMENTS

| 258,432 | A | * | 5/1882 | Keith | 251/303 |
| 995,484 | A | * | 6/1911 | Roger | 251/318 |
| 1,691,626 | A | * | 11/1928 | Cook | 251/285 |
| 1,935,548 | A | * | 11/1933 | Eggleston et al. | 137/505.46 |
| 1,984,770 | A | * | 12/1934 | Sorensen | 251/240 |
| 2,201,095 | A | * | 5/1940 | Kaufman | 251/254 |
| 2,506,063 | A | * | 5/1950 | Carbon | 251/263 |
| 4,564,003 | A | * | 1/1986 | Iwanicki et al. | 126/615 |
| 5,000,013 | A | * | 3/1991 | Rovinsky | 66/168 |
| 5,036,497 | A | * | 7/1991 | Heitman | 367/120 |
| 5,145,146 | A | * | 9/1992 | Matsushima | 251/129.02 |
| 5,494,028 | A | * | 2/1996 | DeVries et al. | 128/205.24 |
| 5,875,807 | A | * | 3/1999 | Schulze | 137/94 |
| 6,129,105 | A | * | 10/2000 | Hec et al. | 137/75 |
| 6,945,511 | B2 | * | 9/2005 | Schulze | 251/149.8 |
| 2003/0150495 | A1 | * | 8/2003 | Hara | 137/597 |

FOREIGN PATENT DOCUMENTS

CN    1825365    *    8/2006

* cited by examiner

*Primary Examiner* — John K Fristoe, Jr.
*Assistant Examiner* — Marina Tietjen
(74) *Attorney, Agent, or Firm* — Raymond Y. Chan; David and Raymond Patent Firm

(57) ABSTRACT

An automate fluid flow control system includes a relief valve for being sealedly disposed within a fluid chamber in an immovable manner to seal a flow of fluid flowing from a fluid inlet to a fluid outlet, and an actuator. The relief valve has a fluid passage for controlling a flow rate of the fluid passing from the fluid chamber to the fluid outlet, and a valve stopper sealedly closing the fluid passage for controlling the fluid flowing from the fluid chamber to the fluid outlet, wherein the valve stopper is driven to move between a closed position that the valve stopper is sealedly retained to close the fluid passage for blocking said fluid passing to the fluid outlet, and an opened position that the valve stopper is moved to unseal the fluid passage for allowing the fluid passing to the fluid outlet through the fluid passage.

4 Claims, 20 Drawing Sheets

AUTOMATE FLUID FLOW CONTROL SYSTEM

CROSS REFERENCE OF RELATED APPLICATION

This is a Continuation-In-Part application that claims the benefit of priority under 35 U.S.C. §119 to a non-provisional application, application Ser. No. 12/460,371, filed Jul. 16, 2009 now U.S. Pat. No. 8,087,636, which is a Continuation application that claims the benefit of priority under 35 U.S.C. §119 to a non-provisional application, application Ser. No. 11/525,769, filed Sep. 22, 2006 now U.S. Pat. No. 7,681,860.

BACKGROUND OF THE PRESENT INVENTION

1. Field of Invention

The present invention relates to a fluid system, and more particularly to an automate fluid flow control system, which allows to control a flow rate and an amount of fluid flowing through a fluid system, such as a faucet system, a toilet system, a showering system, or even a water piping system.

2. Description of Related Arts

A fluid system, such as a toilet system, a faucet system, or a water piping system, generally comprises a fluid inlet, a fluid outlet, and a fluid valve device operatively communicating between the fluid inlet and the fluid outlet to control the fluid flowing from the fluid inlet to the fluid outlet.

For example, a manual operated valve device, using for in the faucet system or the toilet system, comprises a valve body communicating the water inlet with the water outlet, a relief valve disposed in the valve body for blocking the water flowing from the water inlet to the water outlet, and an actuation lever arranged to move the relief valve at a position that the water is allowed to flow to the water outlet for completing the water flowing operation.

For hygiene purposes, an improved valve device provides an automatic operation for the faucet system or the toilet system. Such valve device is a solenoid operated valve for utilizing a latching solenoid to limit power drain on the battery. Accordingly, when the infrared sensor detects the presence of a user of a faucet or toilet, the solenoid operated valve is automatically driven to open to complete the water flowing operation. However, the solenoid valve has several common drawbacks.

The presence of the user sensed by the infrared sensor will cause the solenoid to move the diaphragm to a valve open position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the solenoid operated valve. In other words, the conventional manual operated valve is more reliable than the solenoid operated valve. Thus, the maintenance cost of the solenoid operated valve is higher than that of the conventional manual operated valve.

In addition, the structural design of the solenoid operated valve is different from that of the manual operated valve. In other words, when the fluid system is incorporated with the solenoid operated valve, the fluid system will lose the mechanical-manual operated feature. Therefore, there is no alternative to operate the water flowing cycle when the solenoid operated valve has failed to operate.

In order to install the solenoid operated valve into the conventional fluid system, the mechanical-manual operating mechanism of the valve must be totally removed, which is a waste of resources in order to incorporate with the solenoid operated valve.

The configuration of the solenoid operated valve is complicated, wherein once the solenoid is broken or the battery is dead, the facility should call a technician to open an outer cover and disassemble an inner cover for the replacement of the solenoid or the battery. Due to the complicated structure of the solenoid operated valve, the solenoid operated valve requires a skilled technician to replace the broken solenoid and/or even replace the battery, which may further increase the maintenance cost of the solenoid operated valve.

Especially when the solenoid operated valve is incorporated with the faucet system, the water temperature of the water at the water outlet is preset that cannot be selectively adjusted by the user. It is worth to mention that the user is able to selectively adjust the water temperature at the water outlet via the actuation lever. However, once, the solenoid operated valve is installed into the faucet system, the actuation lever must be removed from the original faucet which cannot be operated manually any more. Therefore, the technician must preset the water temperature for the faucet with the solenoid operated valve.

In addition, the diaphragm is generally made of flexible material, such as rubber, wherein the diaphragm is driven to be popped due to the fluid pressure change within the valve body. Therefore, the diaphragm will be distorted or broken after a period of continued use. In other words, once the diaphragm is placed improper, the diaphragm cannot be sealed within the valve body and it will cause fluid leakage.

The improved valve device cannot control the amount of fluid flowing through the valve body. In fact, the improved valve device can only control the opened/closed position of the valve body. Therefore, the improved valve device cannot be considered as an environmental friendly product. For example, a plurality of water saving aerators must be incorporated with the valve device for water saving purpose. For faucet configuration, a water faucet aerator adapter must be installed into the faucet outlet in order to reduce the amount of water being used. For showering configuration, a showerhead aerator must be installed into to the showerhead. Therefore, every single water system must incorporate particular aerator in order to control the amount of water to be used. In other words, there is no existing valve device able to control the amount of fluid.

SUMMARY OF THE PRESENT INVENTION

The invention is advantageous in that it provides an automate fluid flow control system, which allows to control a flow rate and an amount of fluid flowing through a fluid system, such as a faucet system, a toilet system, a showering system, or even a water piping system.

Another advantage of the invention is to provide an automate fluid flow control system, which also automatically controls a flow of fluid through a fluid system.

Another advantage of the invention is to provide an automate fluid flow control system, wherein the amount of fluid is controlled by the diameter difference between the fluid chamber and the fluid passage.

Another advantage of the invention is to provide an automate fluid flow control system, wherein the amount of fluid can be adjusted and controlled by different sizes of fluid passages.

Another advantage of the invention is to provide an automate fluid flow control system, wherein no diaphragm is fixed within the valve body so as to prevent any fluid leakage due to the distortion of the diaphragm.

Another advantage of the invention is to provide an automate fluid flow control system, which comprises an electric motor as a replacement of the solenoid to control a flow of fluid, so as to enhance the reliable of the operation of the automatic flush flow control system.

Another advantage of the invention is to provide an automate fluid flow control system, which is powered by the electric motor so as to avoid water damage and to enhance performance and reliability.

Another advantage of the invention is to provide an automate fluid flow control system, which provides an economic and efficient solution for incorporating with the conventional manual operated fluid flowing system in a simple and economical way.

Another advantage of the invention is to provide an automate fluid flow control system, which is capable of incorporating with a conventional manual restroom water system, such as urinal or faucet, so as to automatically operate the automate fluid flow control system through the use of a sensor. Alternatively, the automate fluid flow control system can be automatically operated by a remote control instead of the sensor.

Another advantage of the invention is to provide an automate fluid flow control system, wherein the conventional fluid system does not require to alter its original structural configuration in order to incorporate with the present invention. Therefore, the user is able to mechanically-manually operate the fluid system if the automatic operation system is not functioning properly.

Another advantage of the invention is to provide an automate fluid flow control system, which is reliable and is easily installed and maintained in compassion with the convention solenoid operated valve.

Additional advantages and features of the invention will become apparent from the description which follows, and may be realized by means of the instrumentalities and combinations particular point out in the appended claims.

According to the present invention, the foregoing and other objects and advantages are attained by an automate fluid flow control system for a fluid system having a fluid inlet, a fluid outlet, and a fluid chamber communicating between the fluid inlet and the fluid outlet, wherein the automate fluid flow control system comprises:

a relief valve adapted for being sealedly disposed within the fluid chamber to seal a flow of fluid flowing from the fluid inlet to the fluid outlet, wherein the relief valve has a fluid passage having a diameter smaller than a diameter of the fluid chamber, and comprises a valve stopper sitting on a top opening of the fluid passage to seal and close the fluid passage; and an actuator being driven to move the relief valve between a closed position and an opened position, wherein at the closed position, the valve stopper is sealedly retained to close the fluid passage for blocking the fluid passing to the fluid outlet, and at the opened position, the actuator drives the valve stopper to unseal the fluid passage for allowing the fluid passing to the fluid outlet through the fluid passage.

In accordance with another aspect of the invention, the present invention comprises an automate fluid flow control system for a fluid system having a fluid inlet, a fluid outlet, and a fluid chamber communicating between the fluid inlet and the fluid outlet, wherein the automate fluid flow control system comprises:

a valve member adapted for being sealedly disposed within the fluid chamber to seal a flow of fluid flowing from the fluid inlet to the fluid outlet;

a relief valve provided at the valve member for controlling the fluid flowing from the fluid chamber to the fluid outlet, wherein the relief valve has a fluid passage extended along the valve member for communicating the fluid chamber with the fluid outlet and comprises a valve stopper sitting on a top opening of the fluid passage to sealedly close the fluid passage for controlling the fluid flowing to the fluid outlet; and a powering assembly, comprising:

a power generator; and an actuator driven by the power generator to move the relief valve between a closed position and an opened position, wherein at the closed position, the valve stopper is sealedly retained to close the fluid passage for blocking the fluid passing to the fluid outlet, and at the opened position, the actuator drives the valve stopper to unseal the fluid passage for releasing a pressure within the water chamber to allow the fluid passing to the fluid outlet.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
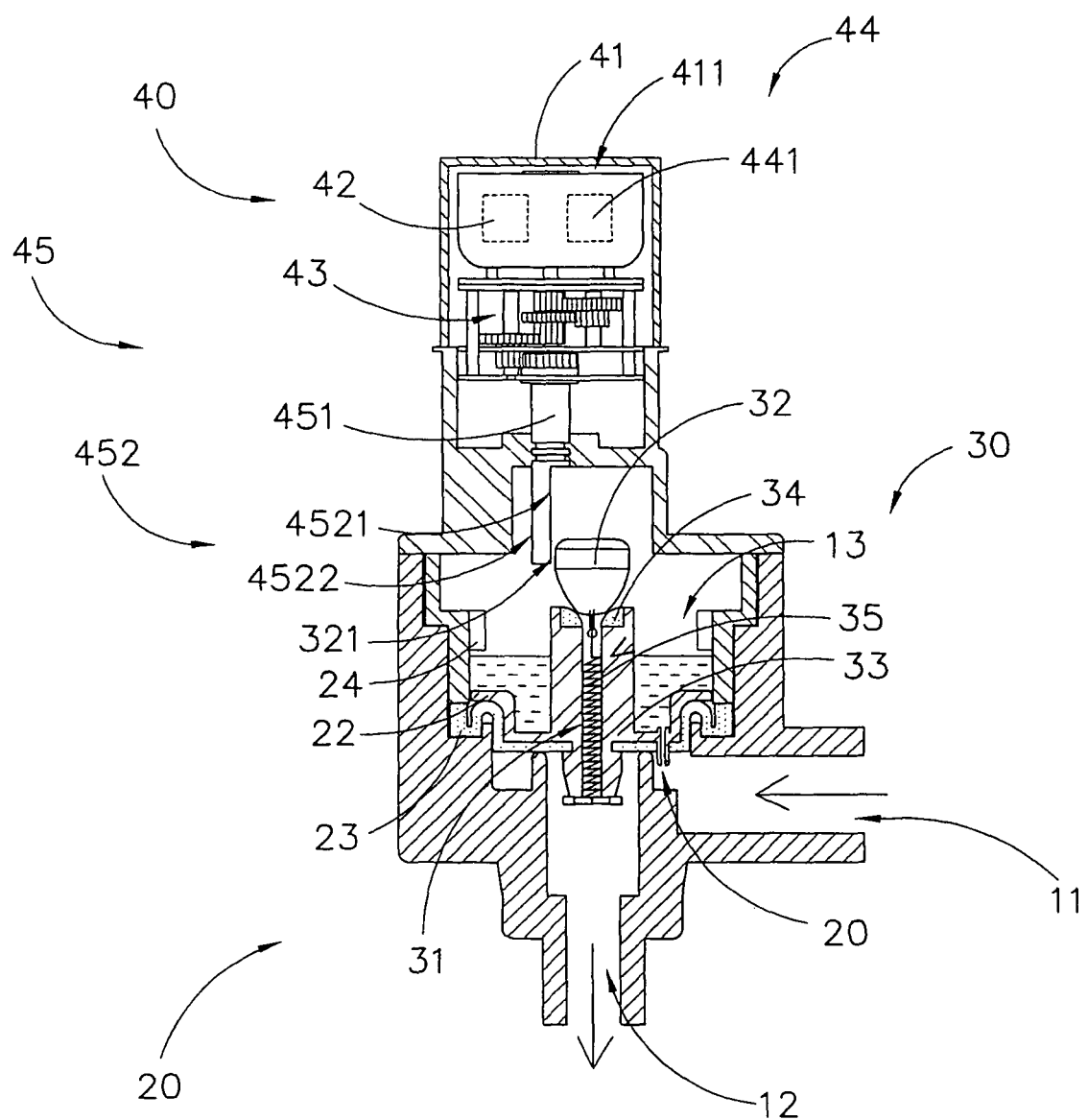
FIG. 1 is a sectional view of an automate fluid flow control system according to a preferred embodiment of the present invention.

Referring to FIG. 1 of the drawings, an automate fluid flow control system according to a preferred embodiment of the present invention is illustrated, wherein the automate fluid flow control system is adapted for incorporating with a conventional fluid system, such as a faucet system, a toilet system, a showering system, or even a fluid piping system.

The fluid system generally has a fluid inlet 11, a fluid outlet 12, and a fluid chamber 13 communicating between the fluid inlet 11 and the fluid outlet 12, wherein a flow of fluid passes from the fluid inlet 11 to the fluid outlet 12 through the fluid chamber 13.

According to the preferred embodiment, the automate fluid flow control system comprises a valve member 20, a relief valve 30, and a powering assembly 40.

The valve member 20 is adapted for being sealedly disposed within the fluid chamber 13 to seal a flow of fluid flowing from the fluid inlet 11 to the fluid outlet 12, wherein the valve member 20 is adapted for retaining a predetermined pressure within the fluid chamber 13 when the valve member 20 is sealed at the fluid chamber 13.

The relief valve 30 is provided at the valve member 20 for controlling the fluid flowing from the fluid chamber 13 to the fluid outlet 12, wherein the relief valve 30 has a fluid passage 31 extended along the valve member 20 for communicating the fluid chamber 13 with the fluid outlet 12 and comprises a valve stopper 32 sitting on a top opening of the fluid passage 31 to sealedly close the fluid passage 31 for controlling the fluid flowing to the fluid outlet 13.

The powering assembly 40 comprises a power generator 43 and an actuator 45 driven by the power generator 41 to move the relief valve 30 between a closed position and an opened position. In which, at the closed position, the valve stopper 32 is sealedly retained to close the fluid passage 31 for blocking the fluid passing to the fluid outlet 13, and at the opened position, the actuator 45 drives the valve stopper 32 to unseal the fluid passage 31 for releasing the pressure within the fluid chamber 13 to allow the fluid passing to the fluid outlet 12.

Accordingly, the valve member 20 comprises a sealing platform 22, having a bleed hole 220, arranged for sitting within the fluid chamber 13 and a sealing diaphragm 23 supported on the sealing platform 22 for movably sealing at the fluid chamber 13 to retain the pressure therewithin so as to normally close the fluid outlet 12.

Figure 2:
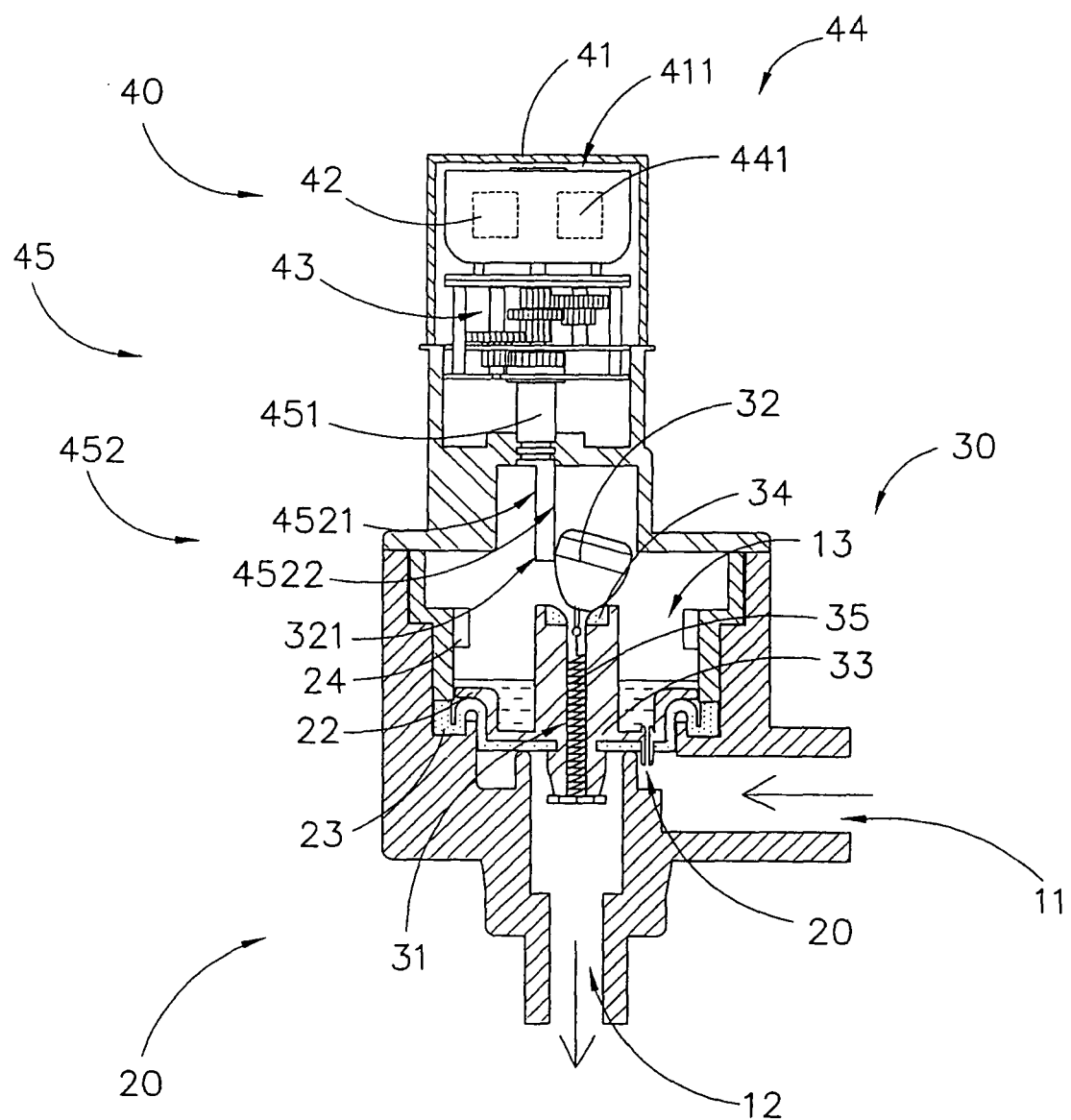
FIG. 2 is a sectional view of the automate fluid flow control system according to the above preferred embodiment of the present invention, illustrating the automatic operation of the automate fluid flow control system when releasing pressure within the fluid chamber.
Figure 3:
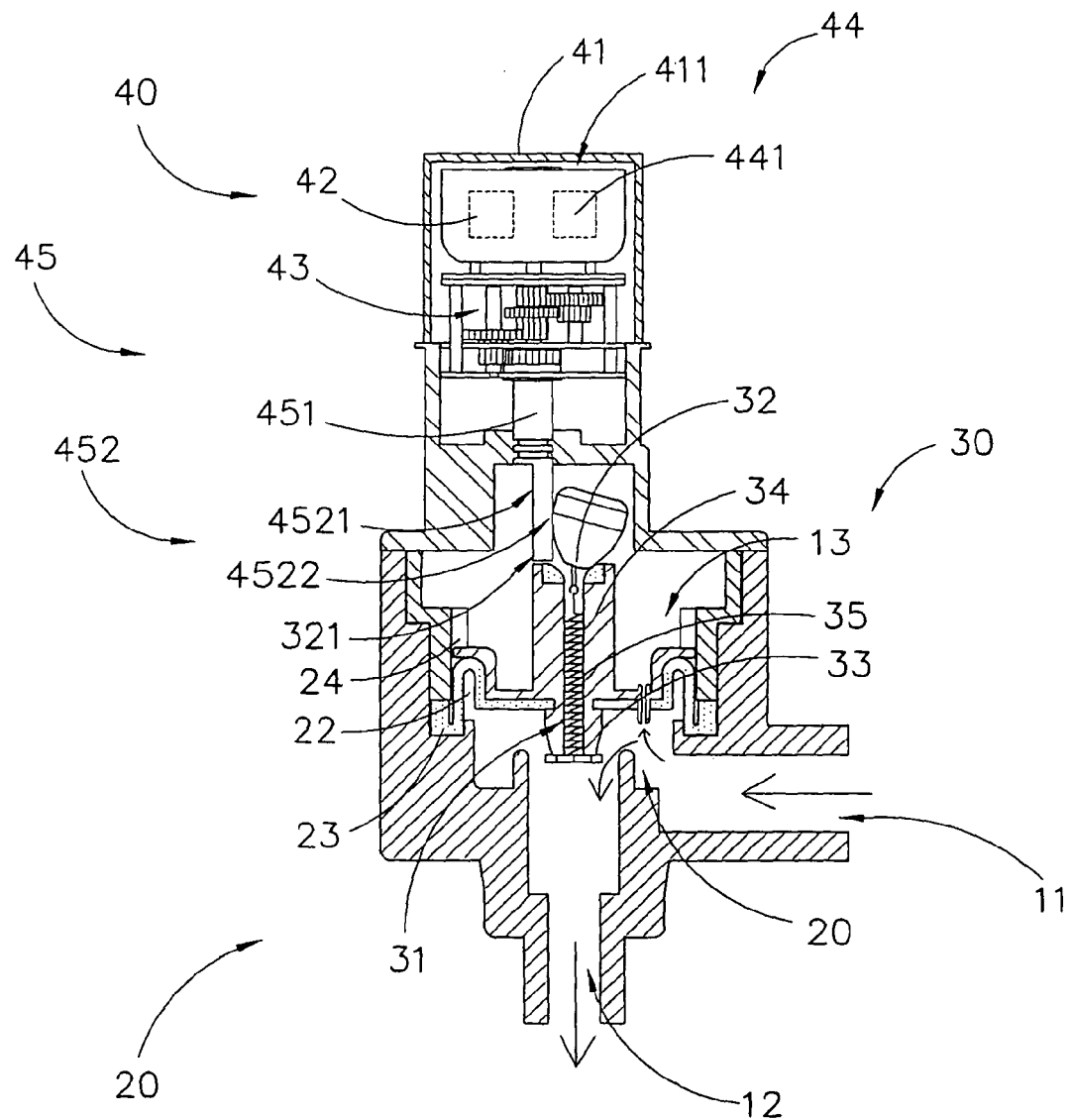
FIG. 3 is a sectional view of the automate fluid flow control system according to the above preferred embodiment of the present invention, illustrating the automatic operation of the automate fluid flow control system when lifting up the valve member.

As shown in FIGS. 1 to 3, when the pressure within the fluid chamber 13 is higher than a pressure at the fluid outlet 12, the sealing platform 22 is pressed to seal the sealing diaphragm 23 at the fluid outlet 12 so as to block the fluid passing from the fluid inlet 11 to the fluid outlet 12. Once the pressure within the fluid chamber 13 is reduced, the sealing platform 22 is automatically lifted that the sealing diaphragm 23 is popped up for unsealing the fluid outlet 12 so as to allow the fluid passing from the fluid inlet 11 to the fluid outlet 12. Accordingly, the bleed hole 220 is arranged for communicating the fluid chamber 13 with the fluid inlet 11.

The valve member 20 further comprises a retention member 24 supported within the fluid chamber 13 at a position above the sealing platform 22 to block the sealing platform 22 to be further lifted up when the pressure within the fluid chamber 13 is reduced.

The relief valve 30 further comprises a valve controlling shaft 33 coaxially extended from the sealing platform 22 of the valve member 20 wherein the fluid passage 31 is extended along the valve controlling shaft 33 for communicating the fluid chamber 13 with the fluid outlet 12. As shown in FIG. 1, the valve controlling shaft 33 has a top end extended within the fluid chamber 13 and a bottom end extended to said water outlet 12. In other words, the top opening of the fluid passage 31, i.e. the top end of the valve controlling shaft 33, is positioned within the fluid chamber 13 while a bottom opening of the fluid passage, i.e. the bottom end of the valve controlling shaft 33, is positioned at the fluid outlet 12 such that the fluid chamber 13 is communicating with the fluid outlet 12 through the fluid passage 31.

The valve stopper 32 is sat on the top end of the controlling shaft 33 at the top opening of the fluid passage 31 to sealedly close the fluid passage 31 for controlling the fluid flowing to the fluid outlet 13. It is worth to mention that when the valve stopper 32 seals the fluid passage 31, the pressure within the fluid chamber is retained to press the valve member 20 to seal at the fluid outlet 12.

According to the preferred embodiment, the relief valve 30 further comprises a sealing ring 34 mounted at the top end of the valve controlling shaft 33 around the top opening of the fluid passage 31 such that the valve stopper 32 is sat on the sealing ring 34 to seal the fluid passage 31 so as to block the fluid passing into the fluid passage 31 from the fluid chamber 13.

In order to retain the valve stopper 32 in position, the relief valve 30 further comprises a resilient element 35 coupling with the valve stopper 32 for applying an urging force against the valve stopper 32 so as to retain the valve stopper 32 at the closed position. According to the preferred embodiment, the resilient element 35 is a compression spring disposed within the fluid passage 31 for applying the urging force against the valve stopper 32 so as to normally pull the valve stopper 32 at the top opening of the fluid passage 31. As shown in FIG. 1, the resilient element 35 has a biasing end coupling with the valve stopper 32 and an opposed affixing end coupled with the bottom opening end of the fluid passage 31 to pull the valve stopper 32 at the top opening of the fluid passage 31 so as to block the fluid passing therethrough. It is worth to mention that a length of the resilient element 35 is shorter than a length of the fluid passage 31 such that when the biasing end and the affixing end of the resilient element 35 are coupled with the valve stopper 32 and the bottom opening end of the fluid passage 31 respectively, the resilient element 35 are stretched to pull the valve stopper 32 at the top opening of the fluid passage 31.

The powering assembly 40 comprises a housing 41, which is mounted on the valve member 20, having a power source compartment 411 and a power source 42 which is replaceably received in the power source compartment 411 and is electrically connected to the power generator 43. It is worth to mention that the power generator 43 is received in the housing 41 as shown in FIG. 1.

The powering assembly 40 further comprises a control processor 44 electrically connected to the power source 42 and the power generator 43 for sensing a presence of a user, so as to activate the power generator 43 to drive the actuator 45 to rotate. Accordingly, the control processor 44 comprises a signal receiver 441, such as an infrared sensor, arranged to detect the presence of the user by means of infrared signal in such a manner that when the signal receiver 441 transmits an infrared signal for detecting the presence of the user of the fluid system, the signal receiver 441 activates the power generator 43 to actuate the actuator 45 to move the valve stopper 32 so as to open the relief valve 30. Accordingly, the housing 41 has a transparent window aligned with the signal receiver 441 for allowing the infrared signal sending out through the transparent window. It is worth to mention that the signal receiver 441 activates the power generator 43 to stop the actuator 45 once the operation of the flush system is completed.

For example, when the automate fluid flow control system is used for the toilet system, the control processor 44 is activated in responsive to the presence of the user. Once the control processor 44 receives the signal at the time the user leaves the toilet system, the control processor 44 activates the power generator 43 to actuate the actuator 45 for opening the relief valve 30 so as to complete the flushing operation of the toilet system. Likewise, when automate fluid flow control system is used for the faucet system, the control processor 44 activates the power generator 43 for opening the relief valve 30 so as to allow water flowing out from the fluid outlet 13. Once the user leaves the faucet system, the control processor 44 activates the power generator 43 to actuate the actuator 45 for closing the relief valve 30.

The power generator 43, according to the preferred embodiment, is an electric motor electrically connected to the control processor 44, wherein the power generator 43 is actuated via the control processor 44 to drive the actuator 45 to rotate. Accordingly, the power generator 43 can be a conventional solenoid electrically connected to the control processor 44 to drive the actuator 45 so as to move the valve stopper 32 between the closed position and the opened position. It is worth to mention that the electric motor is more reliable than the solenoid because the electric motor provides simple mechanical work rather than using the magnetic force, so as to minimize the failure operation of the power generator 43 and to reduce the maintenance cost of the present invention. In addition, the size of the electric motor is so small in comparison with the solenoid so as to reduce the overall size of the automate fluid flow control system of the present invention. Therefore, the electric motor is preferred to be used to not only ensure the reliable of the automate fluid flow control system but also enhance the smooth operation thereof.

The actuator 45 comprises a driving arm 451 rotatably extended from the power generator 43 towards the fluid passage 31 and a pusher arm 452 non-coaxially extended from the driving arm 451 to the valve stopper 32 such that when the driving arm 451 is driven to rotate by the power generator 43, the pusher arm 452 is driven to push the valve stopper 32 at the opened position, as shown in FIG. 2. Once the driving arm 451 is driven to rotate back to its original position, the pusher arm 542 is moved away from the valve stopper 32 such that the valve stopper 32 is pulled back to the closed position, as shown in FIG. 1.

Accordingly, the pusher arm 452 of the actuator 45, having a semi-circular cross section, has a flat contacting surface 4521 and a curved contacting surface 4522, wherein at the closed position, the flat contacting surface 4521 of the pusher arm 452 faces towards the valve stopper 32 such that the valve stopper 32 is sat at the top opening of the fluid passage 31 to seal the fluid passage 31. At the opened position, the pusher arm 452 is rotated at a position that the curved contacting surface 4522 of the pusher arm 452 pushes the valve stopper 32 aside to unseal the flush passage 31 so as to allow the flush flowing to the fluid outlet 12.

As shown in FIG. 1, the valve stopper 32 has a flat side engaging surface 321 substantially engaged with the curved contacting surface 4522 of the pusher arm 452 such that when the actuator 45 is driven to rotate, the valve stopper 32 pushes by the pusher arm 452 at the side engaging surface 321 to unseal the fluid passage 31 so as to ensure the operation of the relief valve 30.

It is worth to mention that when the actuator 45 moves the valve stopper 32 aside the top opening of the flush passage 31, the fluid within the fluid chamber 13 is allowed to flow out through the fluid passage 31 so as to reduce the pressure within the fluid chamber 13, as shown in FIG. 2. At the same time, the fluid from the fluid inlet 11 fills up the fluid chamber 13 through the bleed hole 220 due to the difference of the pressure. Therefore, the sealing diaphragm 23 is lifted to unseal the fluid outlet 12 for allowing the fluid passing to the fluid outlet 12, as shown in FIG. 3. Once the actuator 45 is driven to rotate back to its original position that the valve stopper 32 is pulled back by the resilient element 35 to seal at the top opening of the fluid passage 31, the fluid within the fluid chamber 13 is blocked to flow to the fluid passage 31 and is retained back to its original pressure to stop the fluid flowing to the fluid chamber 13 through the bleed hole 220. Therefore, the sealing diaphragm 23 is dropped down to seal the fluid outlet 12 again. It is worth to mention that when the sealing diaphragm 23 is lifted up, the valve controlling shaft 33 and the valve stopper 32 are correspondingly lifted within the fluid chamber 13. Since the actuator 45 physically contacts with the valve stopper 32, the valve stopper 32 is allowed to move upwardly without affecting the operation of the actuator 45.

Figure 4:
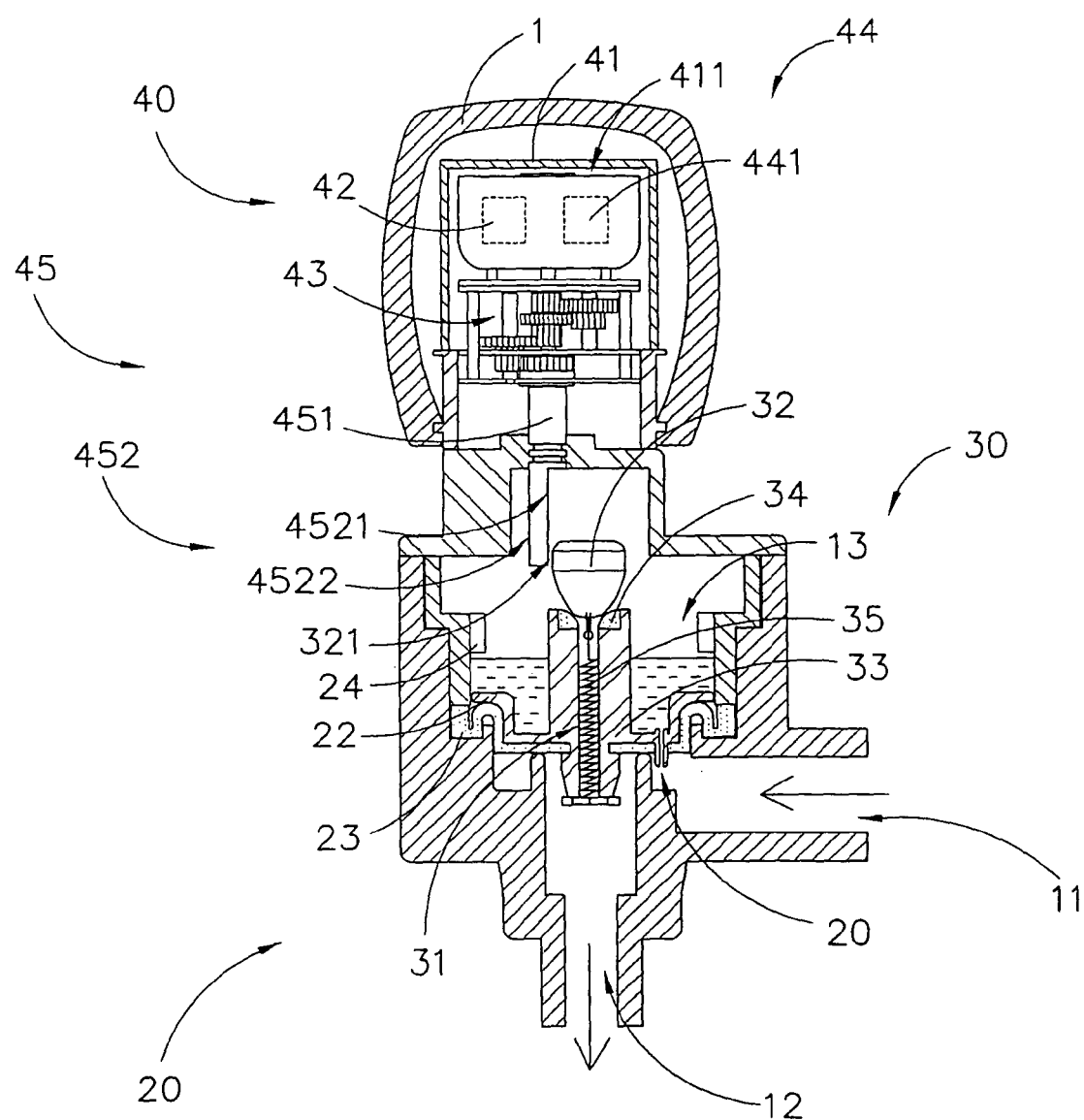
FIG. 4 is a sectional view of the automate fluid flow control system according to the above preferred embodiment of the present invention, illustrating the automate fluid flow control system incorporating with a faucet.

As shown in FIG. 4, the automate fluid flow control system of the present invention incorporates with the faucet system to provide both manual and automatic operation of the faucet system. Accordingly, the faucet system generally comprises a knob 1 operatively controlling the water flowing from the fluid inlet 11 to the fluid outlet 12 through the fluid chamber 13 in a manual manner. Once the faucet system incorporates with the automate fluid flow control system, the faucet system is adapted to be operated manually or automatically.

Figure 5:
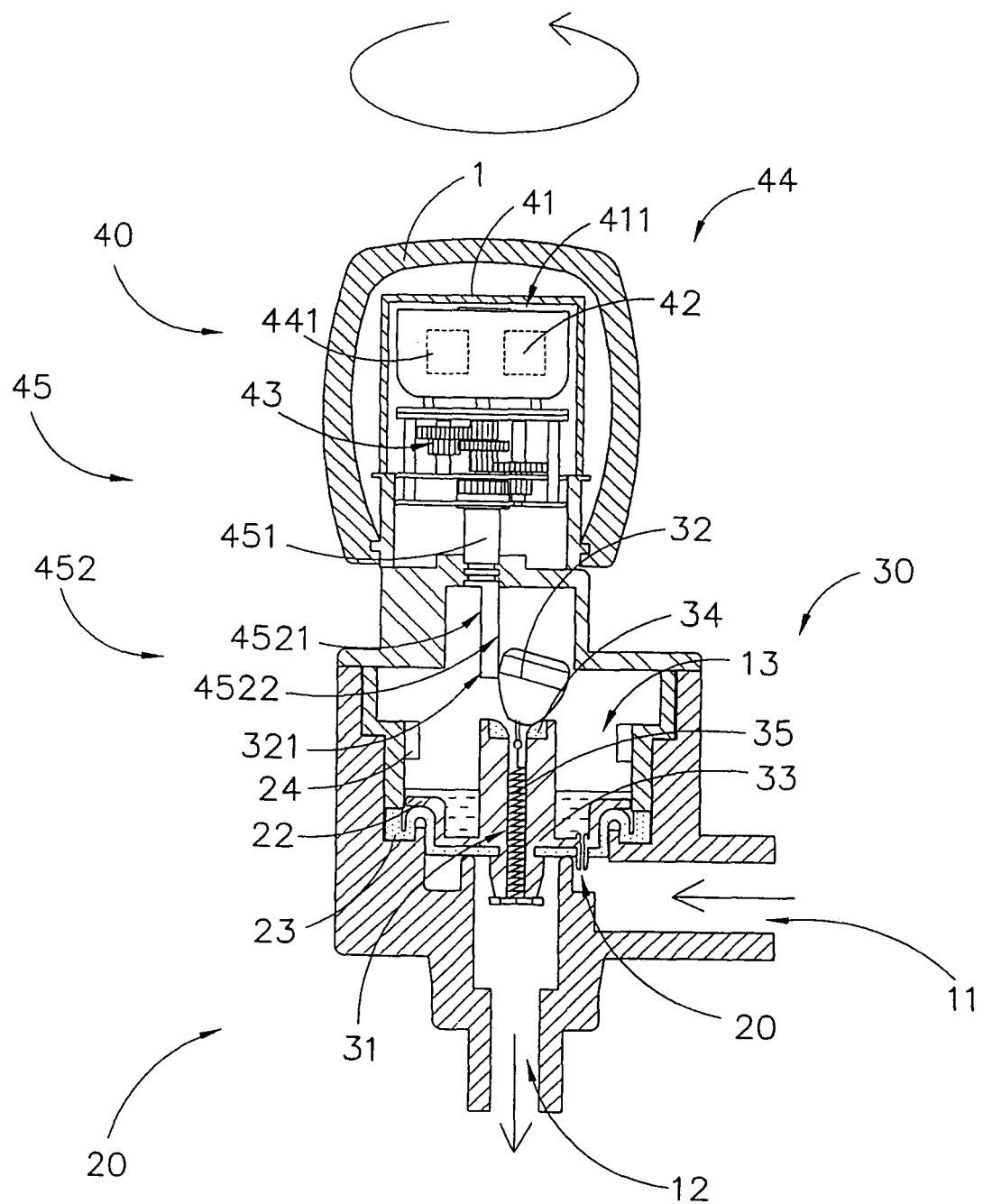
FIG. 5 is a sectional view of the automate fluid flow control system according to the above preferred embodiment of the present invention, illustrating the manual operation of the faucet with the automate fluid flow control system.
Figure 6:
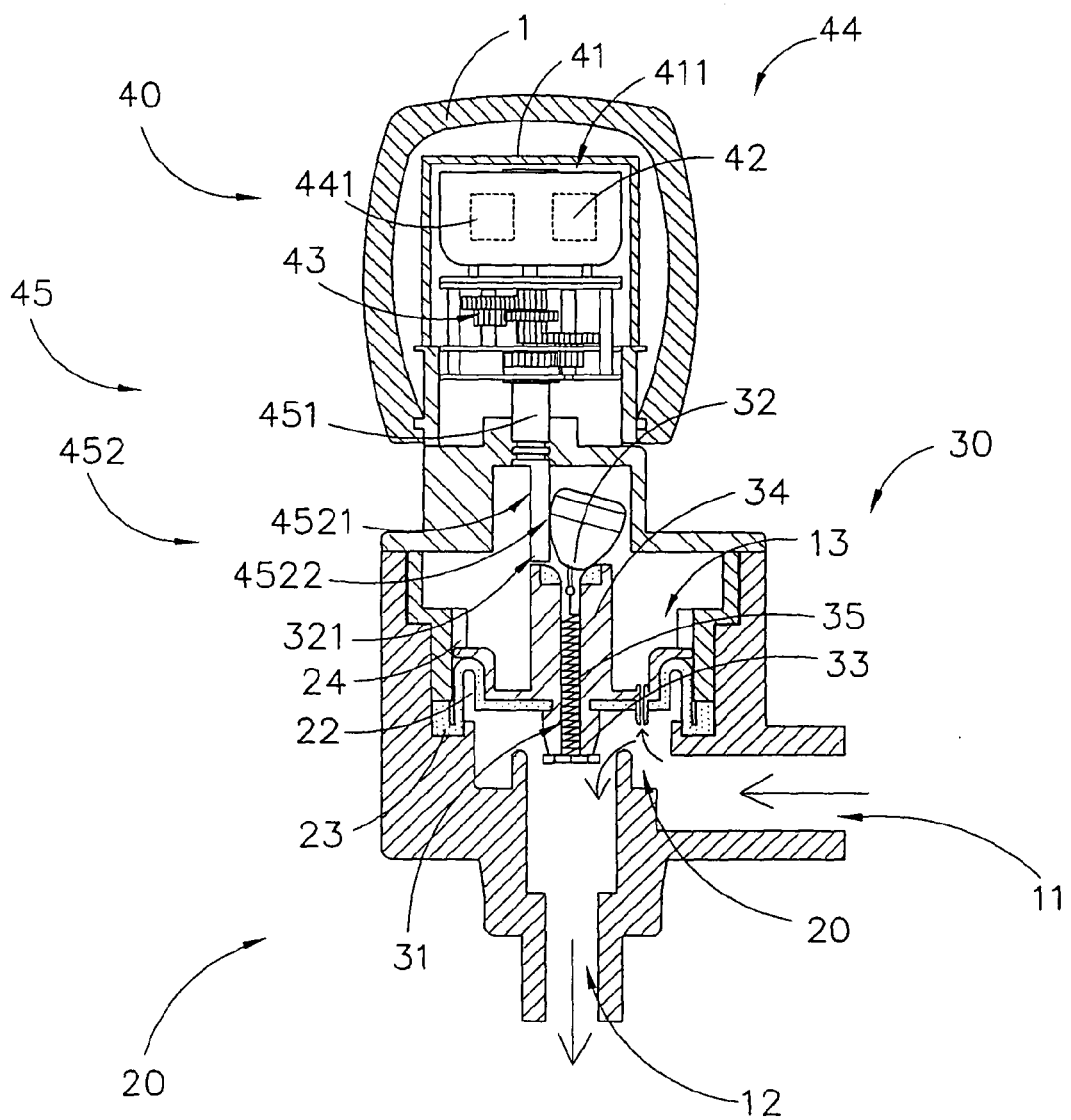
FIG. 6 is a sectional view of the automate fluid flow control system according to the above preferred embodiment of the present invention, illustrating the subsequently manual operation of the faucet with the automate fluid flow control system.

As shown in FIG. 4, the knob 1 of the faucet system is mounted at the housing 41 to manually control the actuator 45. The automate operation of the faucet system is mentioned above via the control processor 44. When the knob 1 is manually turned to drive the powering assembly 40, the actuator 45 is driven to rotate correspondingly, as shown in FIG. 5. Therefore, the pusher arm 452 of the actuator 45 pushes the valve stopper 32 aside to unseal the flush passage 31 so as to allow the flush flowing to the fluid outlet 12. Once the pressure within the fluid chamber 13 is reduced, the sealing diaphragm 23 is lifted to unseal the fluid outlet 12 for allowing the fluid passing to the fluid outlet 12, as shown in FIG. 6. When the knob 1 is turned back to its original position, the valve stopper 32 is pulled back by the resilient element 35 to seal at the top opening of the fluid passage 31. Therefore, the faucet system is adapted to be manually or automatically operated. It is worth to mention that when the knob 1 of the faucet system is adapted to selectively adjust the temperature of the fluid at the fluid outlet 12, the temperature of the fluid can be preset by the user for the automatic operation of the faucet system via the knob.

It is worth to mention that the automate fluid flow control system can be used as a valve for the fluid piping system for control the flow of fluid. In addition, the control processor 44 can be a remote controller that the user is able to remote control the operation of the electric motor to control the flow fluid.

Figure 7:
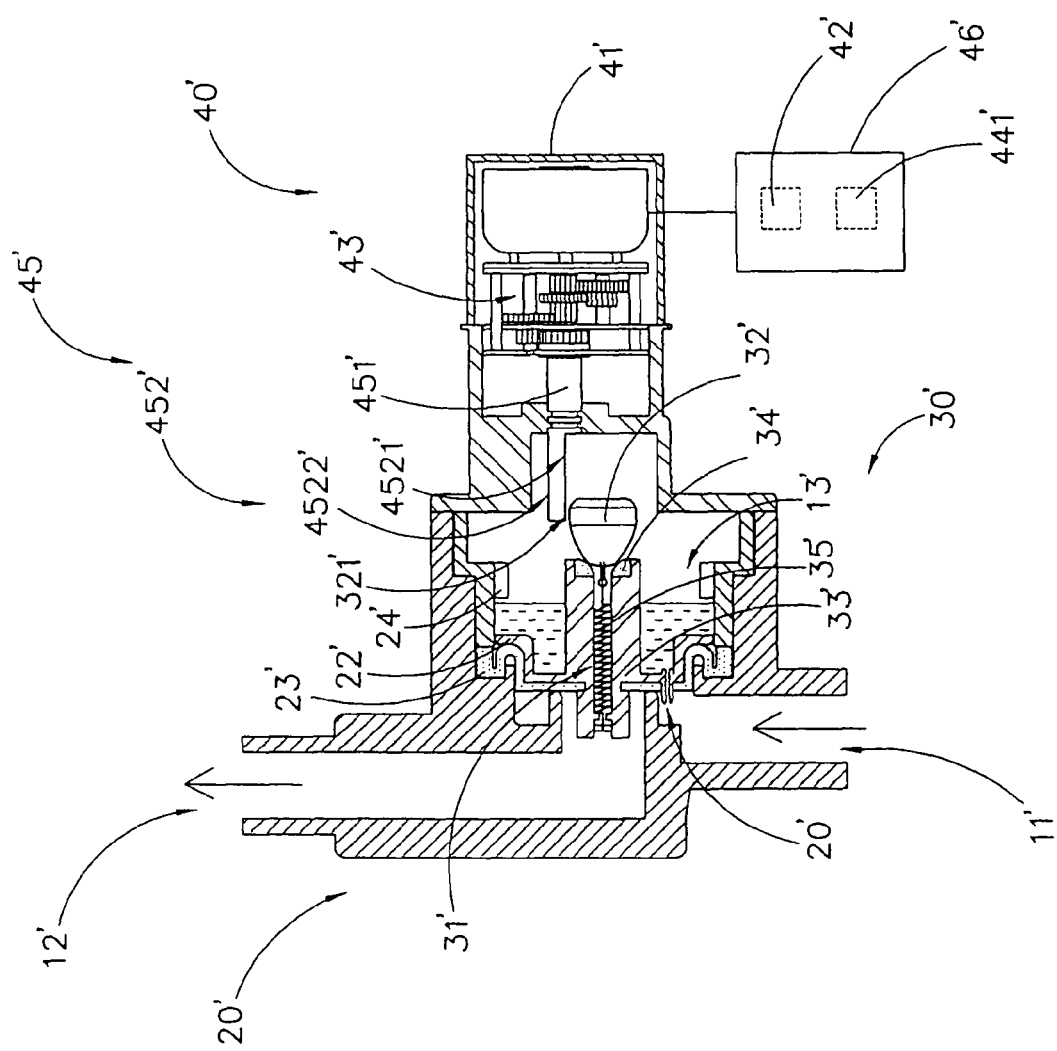
FIG. 7 is a sectional view of an automate fluid flow control system according to a second preferred embodiment of the present invention.

As shown in FIG. 7, an automate fluid flow control system of a second embodiment illustrates an alternative mode of the first embodiment of the present invention, wherein the automate fluid flow control system of the second embodiment is incorporated with the faucet 1'. It is worth to mention that the automate fluid flow control system of the second embodiment has the same structural configuration of the first embodiment such that the second embodiment illustrates the automate fluid flow control system incorporates with the built-in sensor type faucet P. In other words, the operation of the second embodiment is the same as the operation of the first embodiment.

The automate fluid flow control system comprises a valve body 10' having a fluid inlet 11', a fluid outlet 12', and a fluid chamber 13' communicating between the fluid inlet 11' and the fluid outlet 12', wherein a flow of fluid passes from the fluid inlet 11' to the fluid outlet 12' through the fluid chamber 13'. Accordingly, since the automate fluid flow control system is incorporated with the faucet 1', the water, which is the fluid, can pass from the fluid inlet 11' to the fluid outlet 12' through the fluid chamber 13'.

According to the preferred embodiment, the automate fluid flow control system comprises a valve member 20', a relief valve 30', and a powering assembly 40'. In comparison between the second embodiment and the first embodiment, the first embodiment illustrates the fluid inlet 11 as a side entrance and the fluid outlet 12 as a bottom exit as shown in FIG. 1. The second embodiment illustrates the fluid inlet 11' as a bottom entrance and the fluid outlet 12' as a top exit wherein the valve member 20', the relief valve 30', and the powering assembly 40' are sidewardly supported with respect to the valve body 10'. Therefore, the automate fluid flow control system according to the second embodiment can be incorporated with an exiting faucet 1' as shown in FIGS. 8 to 11 by connecting the fluid inlet 11' to the water source, such as cold and/or water supply, and by connecting the fluid outlet 12' to the faucet 1' as shown in FIGS. 8 and 9.

Figure 8:
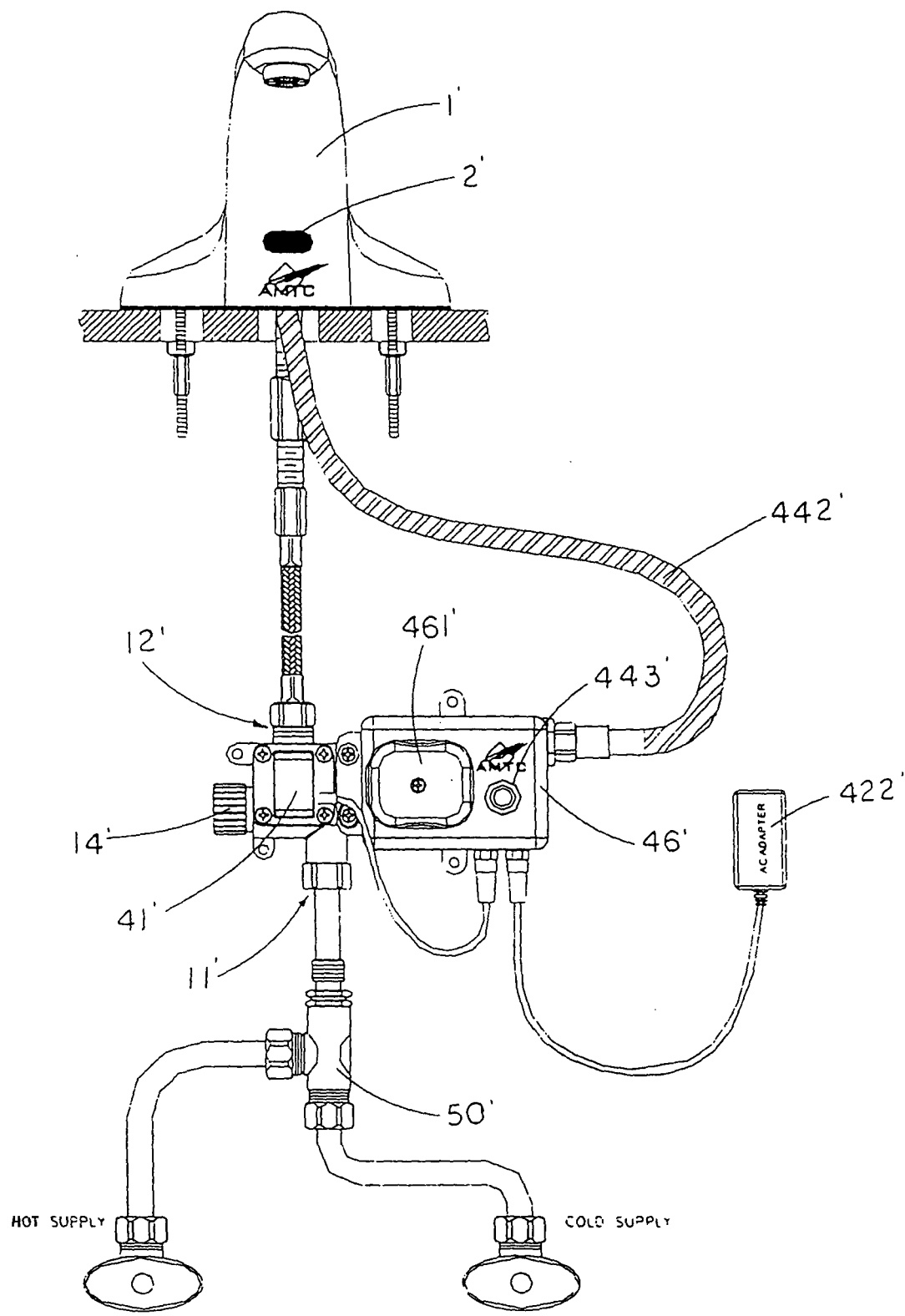
FIG. 8 is a front view of the automate fluid flow control system according to the above second preferred embodiment of the present invention, illustrating the automate fluid flow control system incorporating with a faucet.
Figure 9:
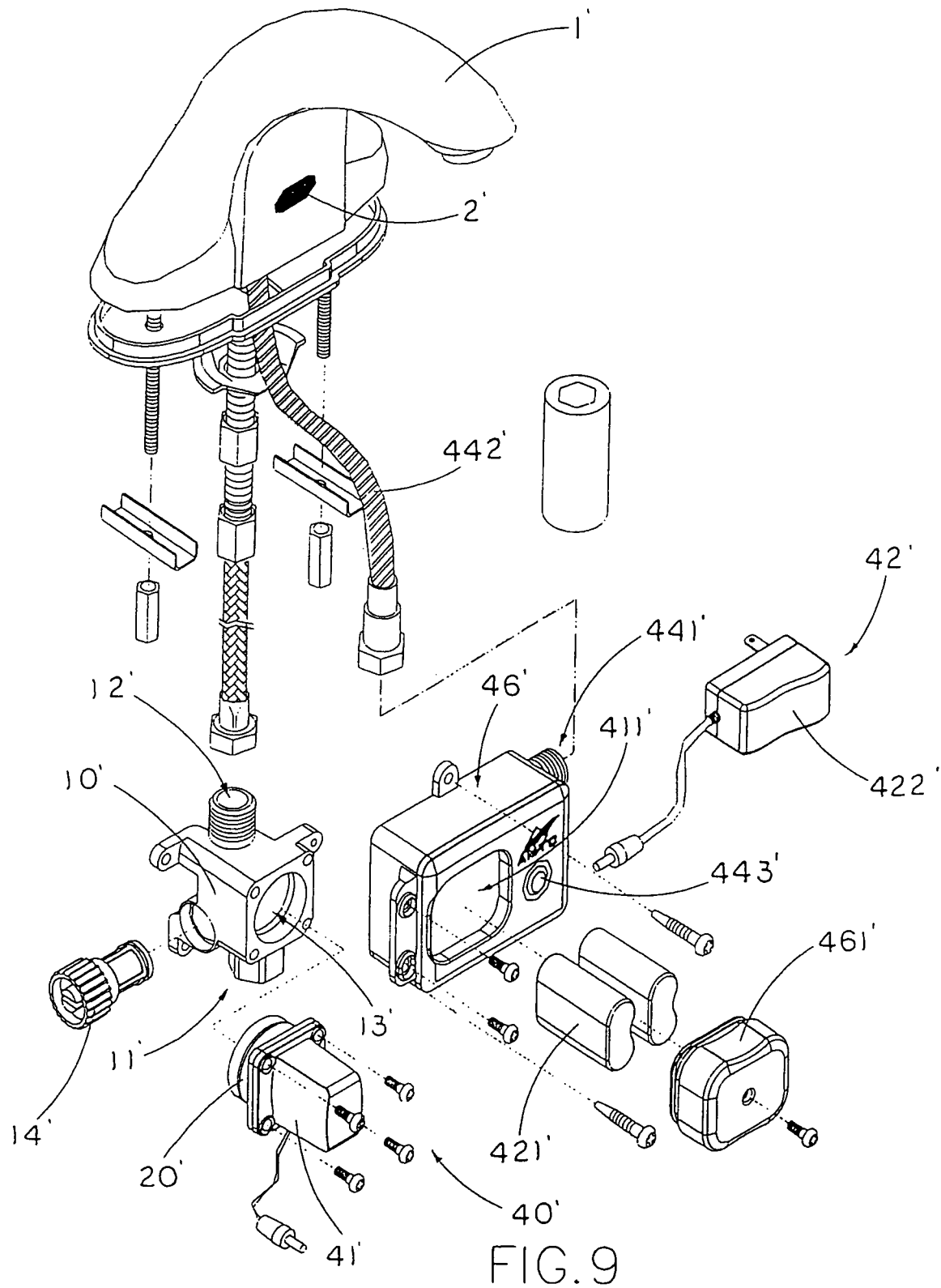
FIG. 9 is an exploded perspective view of the automate fluid flow control system according to the above second preferred embodiment of the present invention.

As shown in FIGS. 8 and 9, the valve body 10' further comprises a water filter 14' supported in the fluid chamber 13' for filtering the water passing from the fluid inlet 11' to the fluid outlet 12'. The water filter 14' can be a replaceable filter detachably mounted to the valve body 10' to filter the water at the fluid chamber 13'.

As shown in FIG. 7, the valve member 20' is sealedly disposed within the fluid chamber 13' to seal a flow of fluid flowing from the fluid inlet 11' to the fluid outlet 12', wherein the valve member 20' is adapted for retaining a predetermined pressure within the fluid chamber 13' when the valve member 20' is sealed at the fluid chamber 13'.

The relief valve 30' is provided at the valve member 20' for controlling the fluid flowing from the fluid chamber 13' to the fluid outlet 12', wherein the relief valve 30' has a fluid passage 31' extended along the valve member 20' for communicating the fluid chamber 13' with the fluid outlet 12' and comprises a valve stopper 32' sitting on a top opening of the fluid passage 31' to sealedly close the fluid passage 31' for controlling the fluid flowing to the fluid outlet 13'.

The powering assembly 40' comprises a power generator 43' and an actuator 45' driven by the power generator 41' to move the relief valve 30 between a closed position and an opened position. In which, at the closed position, the valve stopper 32' is sealedly retained to close the fluid passage 31' for blocking the fluid passing to the fluid outlet 13', and at the opened position, the actuator 45' drives the valve stopper 32' to unseal the fluid passage 31' for releasing the pressure within the fluid chamber 13' to allow the fluid passing to the fluid outlet 12'.

Accordingly, the valve member 20' comprises a sealing platform 22', having a bleed hole 220', arranged for sitting within the fluid chamber 13' and a sealing diaphragm 23' supported on the sealing platform 22' for movably sealing at the fluid chamber 13' to retain the pressure therewithin so as to normally close the fluid outlet 12'.

When the pressure within the fluid chamber 13' is higher than a pressure at the fluid outlet 12', the sealing platform 22' is pressed to seal the sealing diaphragm 23' at the fluid outlet 12' so as to block the fluid passing from the fluid inlet 11' to the fluid outlet 12'. Once the pressure within the fluid chamber 13' is reduced, the sealing platform 22' is automatically lifted that the sealing diaphragm 23' is popped up for unsealing the fluid outlet 12' so as to allow the fluid passing from the fluid inlet 11 to the fluid outlet 12'. Accordingly, the bleed hole 220' is arranged for communicating the fluid chamber 13' with the fluid inlet 11'.

The valve member 20' further comprises a retention member 24' supported within the fluid chamber 13' at a position above the sealing platform 22' to block the sealing platform 22' to be further lifted up when the pressure within the fluid chamber 13 is reduced.

The relief valve 30' further comprises a valve controlling shaft 33' coaxially extended from the sealing platform 22' of the valve member 20' wherein the fluid passage 31' is extended along the valve controlling shaft 33' for communicating the fluid chamber 13' with the fluid outlet 12'. The valve controlling shaft 33' has a top end extended within the fluid chamber 13' and a bottom end extended to said water outlet 12'. In other words, the top opening of the fluid passage 31', i.e. the top end of the valve controlling shaft 33', is positioned within the fluid chamber 13' while a bottom opening of the fluid passage, i.e. the bottom end of the valve controlling shaft 33', is positioned at the fluid outlet 12' such that the fluid chamber 13' is communicating with the fluid outlet 12' through the fluid passage 31'.

The valve stopper 32' is sat on the top end of the controlling shaft 33' at the top opening of the fluid passage 31' to sealedly close the fluid passage 31 for controlling the fluid flowing to the fluid outlet 13'. It is worth to mention that when the valve stopper 32' seals the fluid passage 31', the pressure within the fluid chamber is retained to press the valve member 20' to seal at the fluid outlet 12'.

According to the preferred embodiment, the relief valve 30' further comprises a sealing ring 34' mounted at the top end of the valve controlling shaft 33' around the top opening of the fluid passage 31' such that the valve stopper 32' is sat on the sealing ring 34' to seal the fluid passage 31' so as to block the fluid passing into the fluid passage 31' from the fluid chamber 13'.

In order to retain the valve stopper 32' in position, the relief valve 30' further comprises a resilient element 35' coupling with the valve stopper 32' for applying an urging force against the valve stopper 32' so as to retain the valve stopper 32' at the closed position. According to the preferred embodiment, the resilient element 35' is a compression spring disposed within the fluid passage 31' for applying the urging force against the valve stopper 32' so as to normally pull the valve stopper 32' at the top opening of the fluid passage 31'. As shown in FIG. 7, the resilient element 35' has a biasing end coupling with the valve stopper 32' and an opposed affixing end coupled with the bottom opening end of the fluid passage 31' to pull the valve stopper 32' at the top opening of the fluid passage 31' so as to block the fluid passing therethrough. It is worth to mention that a length of the resilient element 35' is shorter than a length of the fluid passage 31' such that when the biasing end and the affixing end of the resilient element 35' are coupled with the valve stopper 32' and the bottom opening end of the fluid passage 31' respectively, the resilient element 35' are stretched to pull the valve stopper 32' at the top opening of the fluid passage 31'.

The powering assembly 40' comprises a housing 41' mounted on the valve member 20' to house the power generator 43' and the actuator 45', and has a power source compartment 411' and a power source 42' which is replaceably received in the power source compartment 411' and is electrically connected to the power generator 43'. It is worth to mention that the power generator 43' is received in the housing 41'.

The powering assembly 40' further comprises a control module 46' operatively connected to the power generator 43', wherein the power source compartment 411' is formed in the control module 46' to receive the power source 42' therein.

Figures 10A, 10B:
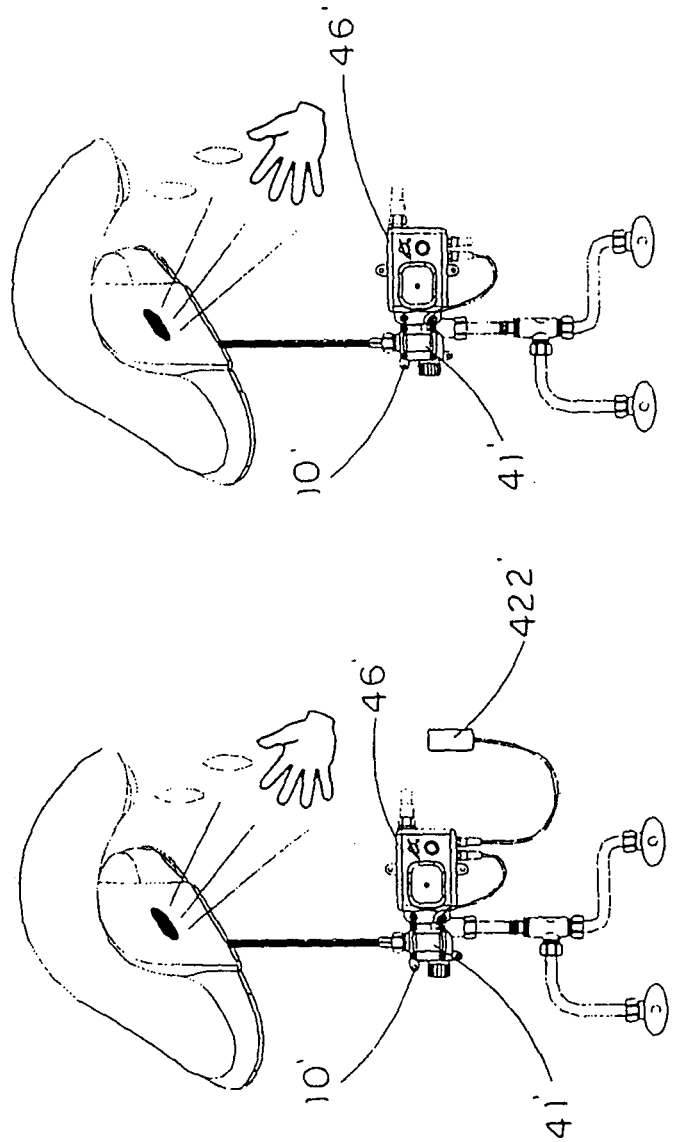
FIGS. 10A and 10B illustrate the automate fluid flow control system powered by batteries and/or AC power according to the above second preferred embodiment of the present invention.
Figure 11:
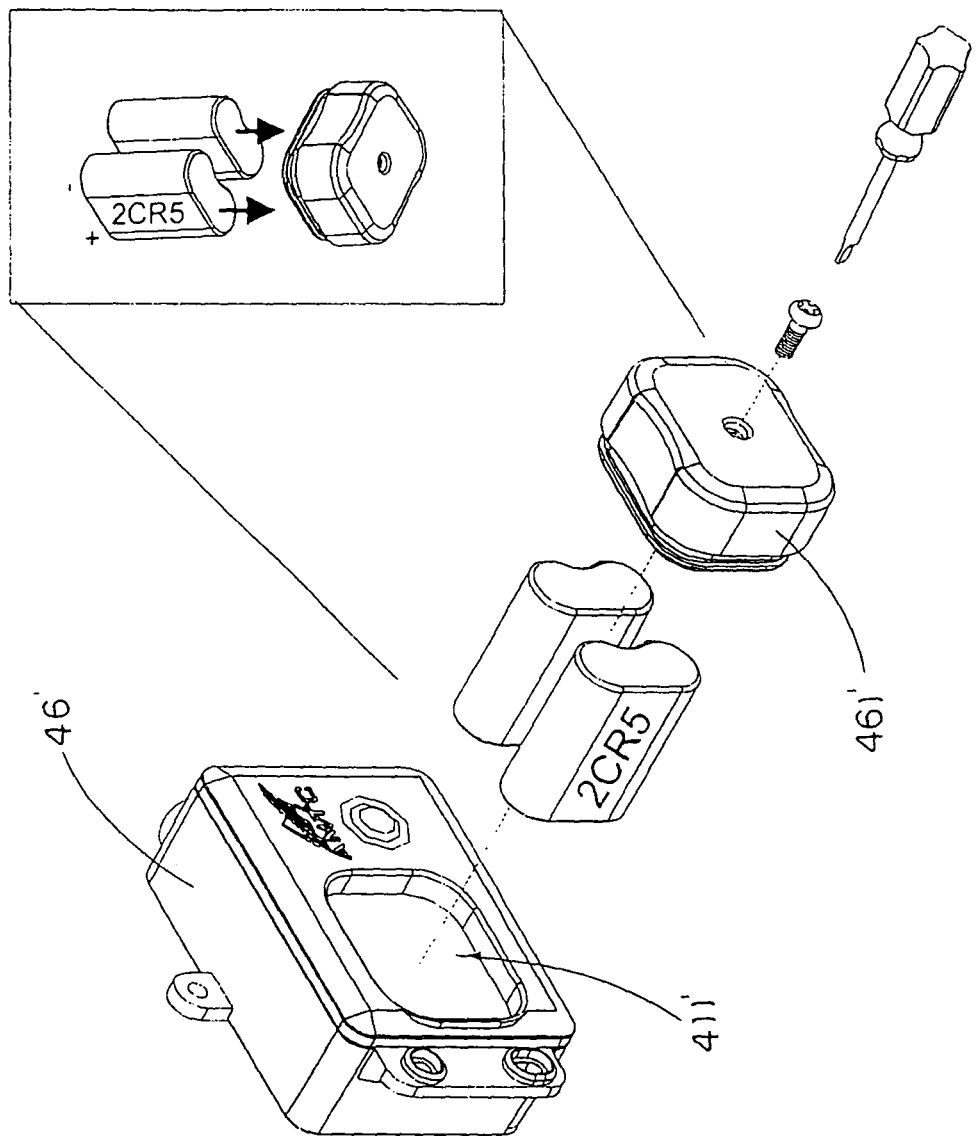
FIG. 11 illustrates the battery installation of the automate fluid flow control system according to the above second preferred embodiment of the present invention.
Figure 12:
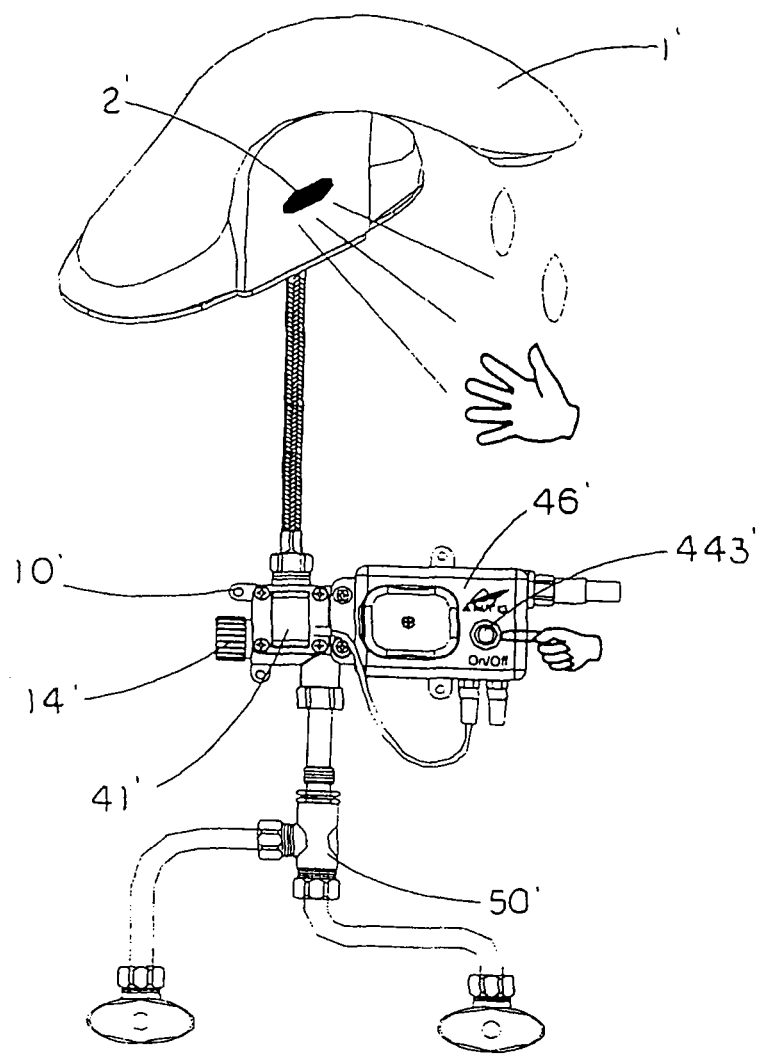
FIG. 12 illustrates the setting of the sensor range of the automate fluid flow control system according to the above second preferred embodiment of the present invention.

As shown in FIGS. 10A and 10B, the power source 42' can be a battery 421' and/or AC power. For AC current, the power source 42' further comprises an AC adapter 422' electrically connecting to an external AC power such that the automate fluid flow control system can be selectively powered by either battery or AC power. As shown in FIG. 10A, both battery 421' and the AC adapter 422' are used wherein the rechargeable battery 421' is used as a backup power source. It is worth to mention that the battery 421' will not drain with AC adapter 422' on. If the AC adapter 422' is not connected, as shown in FIG. 10B, the battery 421' is used for power. It is worth to mention that the battery 421' can be a rechargeable battery or a replaceable battery. Therefore, the user is able to replace the old battery by simply opening a control module cover 461' of the control module 46' to expose the power source compartment 411', as shown in FIG. 11.

The powering assembly 40' further comprises a control processor 44' electrically connected to the power source 42' and the power generator 43' for sensing a presence of a user, so as to activate the power generator 43' to drive the actuator 45' to rotate. The control processor 44' is received in the control module 46' to electrically connect to the power source 42'. Accordingly, the control processor 44' comprises a signal receiver 441' for receiving an infrared signal from an infrared sensor which is arranged to detect the presence of the user by means of infrared signal. When the signal receiver 441' receives an infrared signal from the infrared sensor which detects the presence of the user of the fluid system, the signal receiver 441' activates the power generator 43' to actuate the actuator 45' to move the valve stopper 32' so as to open the relief valve 30'. Accordingly, since the faucet 1' has a built-in sensor 2', a signal cable 442' can be simply used to connect the built-in sensor 2' of the faucet 1' to transmit the signal from the built-in sensor 2' to the signal receiver 441'. It is worth to mention that the signal receiver 441' activates the power generator 43' to stop the actuator 45' once the operation of the faucet 1' is completed.

In other words, when the automate fluid flow control system is used for the faucet system, the control processor 44' is activated in responsive to the presence of the user. Once the control processor 44' receives the signal at the time the hand of the user locates within the coverage of the built-in sensor 2' of the faucet 1', the signal receiver 441' receives an infrared signal from the built-in sensor 2'. Then, the control processor 44' activates the power generator 43' to actuate the actuator 45' for opening the relief valve 30' so as to allow the water flowing to the faucet 1'. Once the hand of the user locates out of the coverage of the built-in sensor 2' of the faucet 1', the control processor 44' activates the power generator 43' to actuate the actuator 45' for closing the relief valve 30'.

In other words, to activate the faucet 1', the user must place his/her hand(s) under the spout of the faucet 1' where the coverage of the built-in sensor 2' covers. The sensor beam from the built-in sensor 2' will become interrupted and the faucet 1' will activate on. The faucet 1' will remain on until the user has completely moved the hand(s) away from the sensing beam. Once the hand(s) of the user moves out of the coverage of the built-in sensor 2', the faucet 1' will turn completely off after approximately two seconds.

The control processor 44' is adapted to set the sensor range of the built-in sensor 2'. The control processor 44' comprises a control button 443' provided at the control module 46' to control the sensor range of the built-in sensor 2'. Accordingly, when the user pushes the control button 443' located on the front side of the control module 46' and keeps pushing it for about 5 to 7 seconds, the built-in sensor 2' of the faucet 1' will activate once and the red LED light located on the sensor eye of the spout will be on. Once the LED light is on, the user can release the control button 443', the built-in sensor 2' of the faucet 1' will go into setup mode. The user is able to use one hand and place the hand exactly in front of the sensor eye of the built-in sensor 2' at the distance that the user would like to sensor to reach. Once the user have placed the hand at the desired sensing distance, the user would keep the hand steady at that point for about 5 to 10 seconds until the red LED light beings to flash continuously. Once the LED light begins to flash, the user is able to use the free hand to press the control button 443' while the control hand still holds at the desired sensing point. This will lock the sensing range at that desired point.

The power generator 43', according to the preferred embodiment, is an electric motor electrically connected to the control processor 44', wherein the power generator 43' is actuated via the control processor 44' to drive the actuator 45' to rotate. Accordingly, the power generator 43' can be a conventional solenoid electrically connected to the control processor 44' to drive the actuator 45' so as to move the valve stopper 32' between the closed position and the opened position. It is worth to mention that the electric motor is more reliable than the solenoid because the electric motor provides simple mechanical work rather than using the magnetic force, so as to minimize the failure operation of the power generator 43' and to reduce the maintenance cost of the present invention. In addition, the size of the electric motor is so small in comparison with the solenoid so as to reduce the overall size of the automate fluid flow control system of the present invention. Therefore, the electric motor is preferred to be used to not only ensure the reliable of the automate fluid flow control system but also enhance the smooth operation thereof.

The actuator 45' comprises a driving arm 451' rotatably extended from the power generator 43' towards the fluid passage 31' and a pusher arm 452' non-coaxially extended from the driving arm 451' to the valve stopper 32' such that when the driving arm 451' is driven to rotate by the power generator 43', the pusher arm 452' is driven to push the valve stopper 32' at the opened position, which is similar to FIG. 2. Once the driving arm 451' is driven to rotate back to its original position, the pusher arm 542' is moved away from the valve stopper 32' such that the valve stopper 32' is pulled back to the closed position, as shown in FIG. 7.

Accordingly, the pusher arm 452' of the actuator 45', having a semi-circular cross section, has a flat contacting surface 4521' and a curved contacting surface 4522', wherein at the closed position, the flat contacting surface 4521' of the pusher arm 452' faces towards the valve stopper 32' such that the valve stopper 32' is sat at the top opening of the fluid passage 31' to seal the fluid passage 31'. At the opened position, the pusher arm 452' is rotated at a position that the curved contacting surface 4522' of the pusher arm 452' pushes the valve stopper 32' aside to unseal the flush passage 31' so as to allow the flush flowing to the fluid outlet 12'.

Accordingly, the valve stopper 32' has a flat side engaging surface 321' substantially engaged with the curved contacting surface 4522' of the pusher arm 452' such that when the actuator 45' is driven to rotate, the valve stopper 32' pushes by the pusher arm 452' at the side engaging surface 321' to unseal the fluid passage 31' so as to ensure the operation of the relief valve 30'.

It is worth to mention that when the actuator 45' moves the valve stopper 32' aside the top opening of the flush passage 31', the fluid within the fluid chamber 13' is allowed to flow out through the fluid passage 31' so as to reduce the pressure within the fluid chamber 13'. At the same time, the fluid from the fluid inlet 11' fills up the fluid chamber 13' through the bleed hole 220' due to the difference of the pressure. Therefore, the sealing diaphragm 23' is lifted to unseal the fluid outlet 12' for allowing the fluid passing to the fluid outlet 12'. Once the actuator 45' is driven to rotate back to its original position that the valve stopper 32' is pulled back by the resilient element 35' to seal at the top opening of the fluid passage 31', the fluid within the fluid chamber 13' is blocked to flow to the fluid passage 31' and is retained back to its original pressure to stop the fluid flowing to the fluid chamber 13' through the bleed hole 220'. Therefore, the sealing diaphragm 23' is dropped down to seal the fluid outlet 12' again. It is worth to mention that when the sealing diaphragm 23' is lifted up, the valve controlling shaft 33' and the valve stopper 32' are correspondingly lifted within the fluid chamber 13'. Since the actuator 45' physically contacts with the valve stopper 32', the valve stopper 32' is allowed to move upwardly without affecting the operation of the actuator 45'.

It is worth to mention that the automate fluid flow control system allows hot and cold water passing therethrough to the faucet 1', wherein a thermostatic mixing valve 50' is used to connect to hot water supply and cold water supply such that the user is able to adjust the temperature of the water to flow to the faucet 1' through the automate fluid flow control system by selectively adjusting the ratio of the hot and cold water from the hot water supply and cold water supply respectively.

Figure 13:
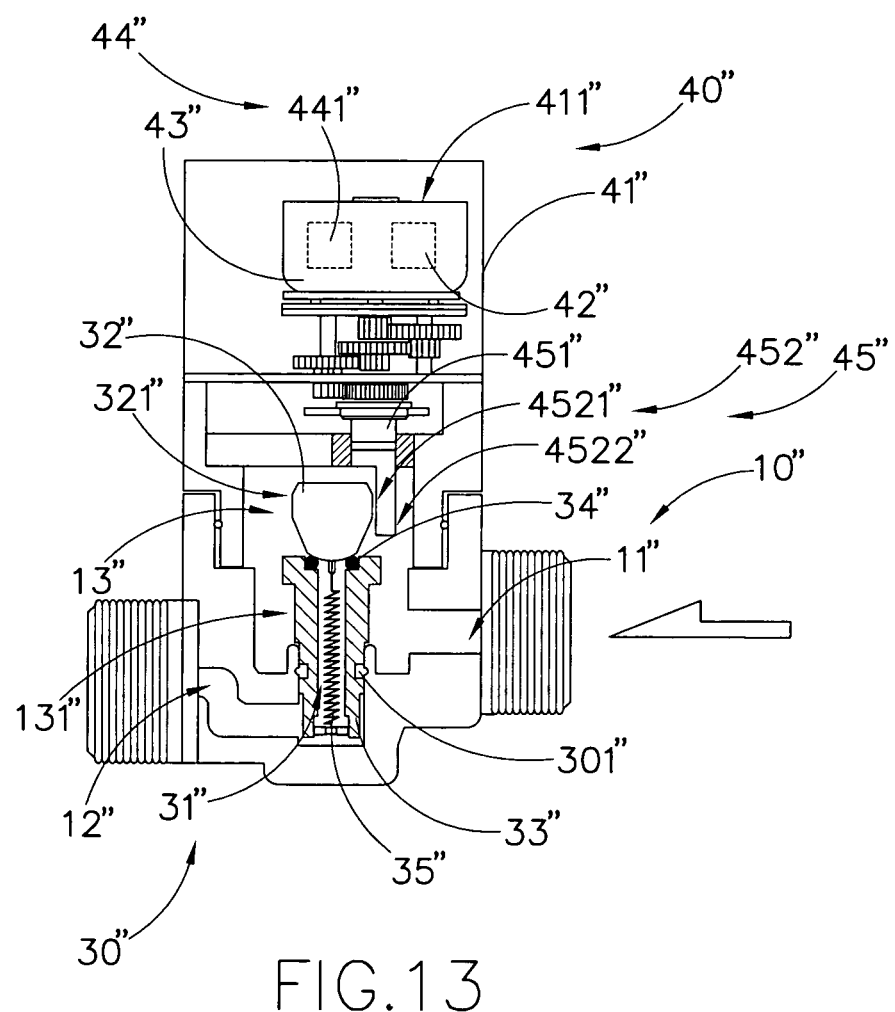
FIG. 13 is a sectional view of an automate fluid flow control system according to a third preferred embodiment of the present invention, illustrating the valve stopper at a closed position.

As shown in FIG. 13, an automate fluid flow control system of a third embodiment illustrates an alternative mode of the first and second embodiments of the present invention, wherein the automate fluid flow control system of the third embodiment is embodied as a diaphragm-less fluid control system.

The automate fluid flow control system comprises a valve body 10" having a fluid inlet 11", a fluid outlet 12", and a fluid chamber 13" communicating between the fluid inlet 11" and the fluid outlet 12", wherein a flow of fluid passes from the fluid inlet 11" to the fluid outlet 12" through the fluid chamber 13". Accordingly, the automate fluid flow control system of the preferred embodiment can be incorporated with the water system such that water, which is the fluid for example, can pass from the fluid inlet 11" to the fluid outlet 12" through the fluid chamber 13".

According to the third embodiment, the automate fluid flow control system comprises a relief valve 30" and a powering assembly 40". As shown in FIG. 13, the fluid inlet 11" as a side entrance and the fluid outlet 12" as a side exit opposite to the fluid inlet 11".

The relief valve 30" is sealedly disposed within the fluid chamber 13" in an immovable manner to seal a flow of fluid flowing from the fluid inlet 11" to the fluid outlet 12".

Figure 15:
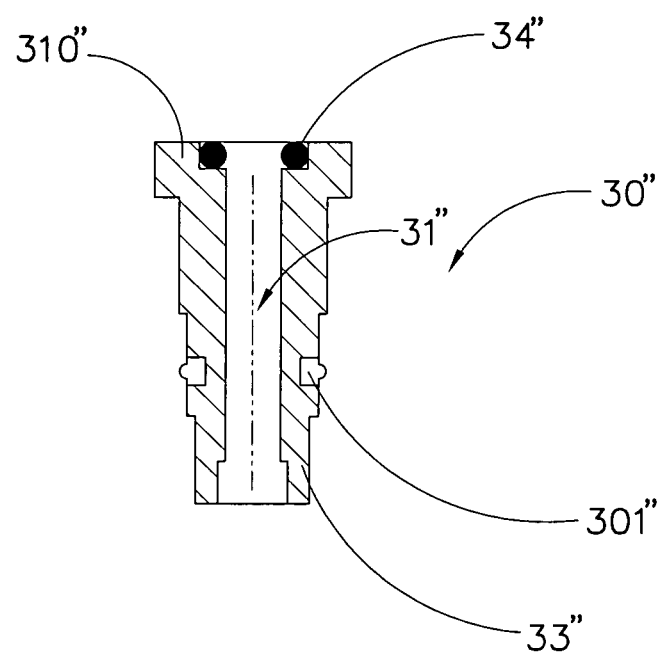
FIG. 15 is a sectional view of the valve controlling shaft of the automate fluid flow control system according to the above third preferred embodiment of the present invention.

As shown in FIG. 15, the relief valve 30" comprises a valve controlling shaft 33', which is immovably sealed at the fluid chamber 13", having a tubular structure and defining a sealing platform 310" on top of the valve controlling shaft 33' and a fluid passage 31" coaxially and downwardly extended from the sealing platform 310", wherein the fluid is guided to pass from the fluid inlet 11" to the fluid outlet 12" through the fluid passage 31". Accordingly, the diameter of the passage opening of the fluid passage 31" is smaller than the diameter of the fluid chamber 13" in order to control the amount of fluid passing to the fluid outlet 12".

The valve controlling shaft 33" has a top end extended within the fluid chamber 13" and a bottom end extended to said water outlet 12". In other words, the passage opening of the fluid passage 31", i.e. the top end of the valve controlling shaft 33" as the top opening of the fluid passage 31", is positioned within the fluid chamber 13" while a bottom opening of the fluid passage 31", i.e. the bottom end of the valve controlling shaft 33", is positioned at the fluid outlet 12" such that the fluid chamber 13" is communicating with the fluid outlet 12" through the fluid passage 31".

The relief valve 30" further comprises a valve stopper 32" sitting on the passage opening of the fluid passage 31" to sealedly close the fluid passage 31" for controlling the fluid flowing to the fluid outlet 12". In particular, the valve stopper 32" is seated at the sealing platform 310" to seal and close the passage opening of the fluid passage 31" so as to block the fluid passing from the fluid inlet 11" to the fluid outlet 12" through the fluid passage 31".

Figure 14:
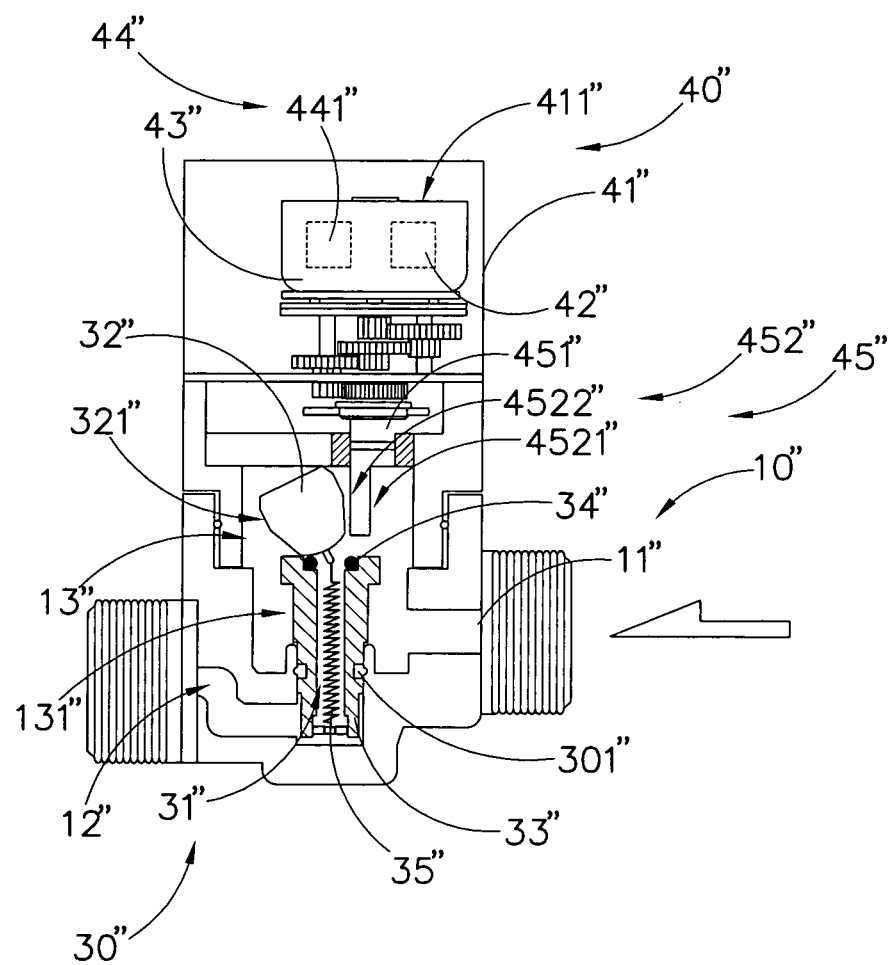
FIG. 14 is a sectional view of the automate fluid flow control system according to the above third preferred embodiment of the present invention, illustrating the valve stopper at an opened position.

According to the preferred embodiment, the valve stopper 32" is moved between a closed position and an opening position. At the closed position, as shown in FIG. 13, the valve stopper 32" is sealedly retained to close the fluid passage 31" for blocking the fluid passing to the fluid outlet 12", and at the opened position, as shown in FIG. 14, the valve stopper 32" is moved to unseal the fluid passage 31' to allow the fluid passing to the fluid outlet 12".

As shown in FIG. 13, the fluid chamber 13" has an elongated fluid channel 131" that the fluid must pass through the fluid channel 131" from the fluid inlet 11" to the fluid outlet 12", wherein the valve controlling shaft 33" is sealed within the fluid channel 131" via a sealing O-ring 301". In other words, the diameter of the passage opening of the fluid passage 31" is smaller than the diameter of the fluid channel 131" of the fluid chamber 13". Accordingly, the sealing O-ring 301" is sealed around an outer surrounding wall of the valve controlling shaft 33" for sealing and coupling within the fluid chamber 13". In other words, the valve controlling shaft 33" cannot be moved within the fluid chamber 13" with respect to any direction because there is no diaphragm movably supported therewithin as it is mentioned in the first and second embodiments. Therefore, no relative movement is required between valve controlling shaft 33" and the valve body 10". In other words, there is no bleed hole to communicate between the fluid inlet 11" and the fluid chamber 13" for balancing the fluid pressure therebetween.

Accordingly, the amount of fluid can be controlled in responsive to the diameter of the passage opening of the fluid passage 31". According to the preferred embodiment, the fluid passage 31" has a uniform diameter. Therefore, the diameter of the fluid passage 31" is the same as the diameter of the passage opening of the fluid passage 31".

When the diameter of the fluid passage 31" is set at 3.7 cm, the flow rate of fluid will be configured as 1 GPM (gallon per minute) through the fluid passage 31". When the diameter of the fluid passage 31" is set at 2.7 cm, the flow rate of fluid will be configured as 0.4 GPM (gallon per minute) through the fluid passage 31". Therefore, by selecting the desired diameter of the fluid passage 31", the flow rate and the amount of fluid can be controlled through the automate fluid flow control system of the present invention. It is worth mentioning that the outer diameter of the valve controlling shaft 33" is fixed while the fluid passage 31" is various. Therefore, the valve body 10" does not require being alternated in order to incorporate with the valve controlling shafts 33" with different diameters of the fluid passage 31".

According to the preferred embodiment, the relief valve 30" further comprises a sealing ring 34" provided at the sealing platform 310" of the valve controlling shaft 33" around the passage opening of the fluid passage 31" such that the valve stopper 32" is sat on the sealing ring 34" to seal the fluid passage 31" so as to block the fluid passing into the fluid passage 31" from the fluid chamber 13". Therefore, the valve stopper 32" is retained at its position on the sealing platform 310" by the sealing ring 34".

It is worth mentioning that the diameter of the passage opening of the fluid passage 31" can be adjusted by replacing the sealing ring 34". When a smaller diameter size of the sealing ring 34" is used, the diameter of the passage opening of the fluid passage 31" will be reduced. When a larger smaller diameter size of the sealing ring 34" is used, the diameter of the passage opening of the fluid passage 31" will be increased.

In order to retain the valve stopper 32" in position, the relief valve 30" further comprises a resilient element 35" coupling with the valve stopper 32" for applying an urging force against the valve stopper 32" so as to retain the valve stopper 32" at the closed position. According to the preferred embodiment, the resilient element 35" is a compression spring disposed within the fluid passage 31" for applying the urging force against the valve stopper 32" so as to normally pull the valve stopper 32" at the passage opening of the fluid passage 31". The resilient element 35" has a biasing end coupling with the valve stopper 32" and an opposed affixing end coupled with the bottom opening end of the fluid passage 31" to pull the valve stopper 32" at the passage opening of the fluid passage 31" so as to block the fluid passing therethrough. It is worth to mention that an original length (non-stretched length) of the resilient element 35" is shorter than a length of the fluid passage 31" such that when the biasing end and the affixing end of the resilient element 35" are coupled with the valve stopper 32" and the bottom opening end of the fluid passage 31" respectively, the resilient element 35" are stretched to pull the valve stopper 32" at the passage opening of the fluid passage 31".

According to the preferred embodiment, the powering assembly 40" comprises an actuator 45" for moving the valve stopper 32" between the closed position and the opened position, and a power generator 43" for driving the actuator 45" to move the relief valve 30" between the closed position and the opened position. In other words, the valve stopper 32" between the closed position and the opened position by the actuation of the power generator 43".

The powering assembly 40" further comprises a housing 41" mounted on the valve body 10' to house the power generator 43" and the actuator 45", and has a power source compartment 411" and a power source 42" which is replaceably received in the power source compartment 411" and is electrically connected to the power generator 43". It is worth to mention that the power generator 43" is received in the housing 41".

As it is mentioned in the first and second embodiment, the power source 42" can be a battery and/or AC power. For AC current, the power source 42" further comprises an AC adapter electrically connecting to an external AC power such that the automate fluid flow control system can be selectively powered by either battery or AC power. Both battery and the AC adapter are used wherein the rechargeable battery is used as a backup power source. It is worth to mention that the battery will not drain with AC adapter on. If the AC adapter is not connected, the battery is used for power. It is worth to mention that the battery can be a rechargeable battery or a replaceable battery. Therefore, the user is able to replace the old battery by simply opening a control module cover of the control module to expose the power source compartment 411'.

The powering assembly 40" further comprises a control processor 44" electrically connected to the power source 42" and the power generator 43" for sensing a presence of a user, so as to activate the power generator 43" to drive the actuator 45" to rotate. The control processor 44" is received in the control module to electrically connect to the power source 42". Accordingly, the control processor 44" comprises a signal receiver 441" for receiving an infrared signal from an infrared sensor which is arranged to detect the presence of the user by means of infrared signal. When the signal receiver 441" receives an infrared signal from the infrared sensor which detects the presence of the user of the fluid system, the signal receiver 441" activates the power generator 43" to actuate the actuator 45" to move the valve stopper 32" so as to open the relief valve 30". Accordingly, when the automate fluid flow control system of the present invention is incorporated with the faucet with a built-in sensor, a signal cable can be simply used to connect the built-in sensor of the faucet to transmit the signal from the built-in sensor to the signal receiver 441'. It is worth to mention that the signal receiver 441' activates the power generator 43' to stop the actuator 45' once the operation of the faucet is completed.

In other words, when the automate fluid flow control system is used for the faucet system, the control processor 44" is activated in responsive to the presence of the user. Once the control processor 44" receives the signal at the time the hand of the user locates within the coverage of the built-in sensor of the faucet, the signal receiver 441' receives an infrared signal from the built-in sensor. Then, the control processor 44" activates the power generator 43" to actuate the actuator 45" for opening the relief valve 30" so as to allow the water flowing to the faucet. Once the hand of the user locates out of the coverage of the built-in sensor of the faucet, the control processor 44" activates the power generator 43" to actuate the actuator 45" for closing the relief valve 30".

In other words, to activate the faucet, the user must place his/her hand(s) under the spout of the faucet where the coverage of the built-in sensor covers. The sensor beam from the built-in sensor will become interrupted and the faucet will activate on. The faucet will remain on until the user has completely moved the hand(s) away from the sensing beam. Once the hand(s) of the user moves out of the coverage of the built-in sensor, the faucet will turn completely off after approximately two seconds.

The control processor 44" is adapted to set the sensor range of the built-in sensor. The control processor 44" comprises a control button provided at the control module to control the sensor range of the built-in sensor. Accordingly, when the user pushes the control button located on the front side of the control module and keeps pushing it for about 5 to 7 seconds, the built-in sensor of the faucet will activate once and the red LED light located on the sensor eye of the spout will be on. Once the LED light is on, the user can release the control button, the built-in sensor of the faucet will go into setup mode. The user is able to use one hand and place the hand exactly in front of the sensor eye of the built-in sensor at the distance that the user would like to sensor to reach. Once the user have placed the hand at the desired sensing distance, the user would keep the hand steady at that point for about 5 to 10 seconds until the red LED light beings to flash continuously. Once the LED light begins to flash, the user is able to use the free hand to press the control button while the control hand still holds at the desired sensing point. This will lock the sensing range at that desired point.

The power generator 43", according to the preferred embodiment, is an electric motor electrically connected to the control processor 44", wherein the power generator 43" is actuated via the control processor 44" to drive the actuator 45" to move. In other words, the actuator 45" is driven to move by the electric motor by means of infrared detection-activation. According to the preferred embodiment, the actuator 45" is driven to rotate by the power generator by means of infrared, such that the valve stopper 32" is driven to move between the closed position and the opened position by the rotational movement of the actuator 45'.

Accordingly, the power generator 43" can be a conventional solenoid electrically connected to the control processor 44" to drive the actuator 45" so as to move the valve stopper 32" between the closed position and the opened position. It is worth to mention that the electric motor is more reliable than the solenoid because the electric motor provides simple mechanical work rather than using the magnetic force, so as to minimize the failure operation of the power generator 43" and to reduce the maintenance cost of the present invention. In addition, the size of the electric motor is so small in comparison with the solenoid so as to reduce the overall size of the automate fluid flow control system of the present invention. Therefore, the electric motor is preferred to be used to not only ensure the reliable of the automate fluid flow control system but also enhance the smooth operation thereof.

Accordingly, the actuator 45" is non-coaxially extended to the fluid passage 31" towards the valve stopper 32" and arranged in such a manner that when the actuator 45" is driven to rotate, the actuator 45" is driven to push the valve stopper 32" to unseal the fluid passage 31". In particular, the actuator 45" comprises a driving arm 451" rotatably extended from the power generator 43" towards the fluid passage 31" and a pusher arm 452" non-coaxially extended from the driving arm 451" to the valve stopper 32" such that when the driving arm 451" is driven to rotate by the power generator 43", the pusher arm 452" is driven to push the valve stopper 32" at the opened position, as shown in FIG. 14. Once the driving arm 451" is driven to rotate back to its original position, the pusher arm 542" is moved away from the valve stopper 32" such that the valve stopper 32" is pulled back to the closed position, as shown in FIG. 13.

Accordingly, the pusher arm 452" of the actuator 45", having a semi-circular cross section, has a flat contacting surface 4521" and a curved contacting surface 4522", wherein at the closed position, the flat contacting surface 4521" of the pusher arm 452" to faces towards the valve stopper 32" such that the valve stopper 32" is sat at the passage opening of the fluid passage 31" to seal the fluid passage 31". At the opened position, the pusher arm 452" is rotated at a position that the curved contacting surface 4522" of the pusher arm 452" pushes the valve stopper 32" aside to unseal the flush passage 31" so as to allow the flush flowing to the fluid outlet 12".

Preferably, the valve stopper 32" has a flat side engaging surface 321" substantially engaged with the curved contacting surface 4522" of the pusher arm 452" such that when the actuator 45" is driven to rotate, the valve stopper 32" pushes by the pusher arm 452" at the side engaging surface 321" to unseal the fluid passage 31" so as to ensure the operation of the relief valve 30".

It is worth to mention that when the actuator 45" moves the valve stopper 32" aside the passage opening of the flush passage 31", the fluid within the fluid chamber 13" is allowed to flow out through the fluid passage 31" from the fluid chamber 13' to the fluid outlet 12". At the same time, the fluid from the fluid inlet 11" fills up the fluid chamber 13". Therefore, the fluid will continuously pass from the fluid chamber 13" to the fluid outlet 12'. Once the actuator 45" is driven to rotate back to its original position that the valve stopper 32" is pulled back by the resilient element 35" to seal at the passage opening of the fluid passage 31", the fluid within the fluid chamber 13" is blocked to flow to the fluid passage 31" to stop the fluid passing therethrough. It is worth to mention that since there is no diaphragm installed into the valve body 10", the valve controlling shaft 33" and the valve stopper 32" will not be correspondingly moved within the fluid chamber 13" to affect the operation of the actuator 45".

Accordingly, the automate fluid flow control system of the present invention can be incorporated with different systems. For example, the automate fluid flow control system can be installed into the main water piping system in order to control the amount of water into the house by installing the automate fluid flow control system at the main water entrance of the house. In other words, a pipe end of the main water piping system can be coupled at the fluid inlet 11" of the valve body 10" while another pipe end of the main water piping system can be coupled at the fluid outlet 12" of the valve body 10" such that water must be guided to flow through the fluid passage 31" before entering into the house.

Accordingly, there are two ways to control the flow rate and the volume of water passing through the valve body 10". The first way, as it is mentioned above, is to change the diameter size of the sealing ring 34" provided at the sealing platform 310" of the valve controlling shaft 33" around the passage opening of the fluid passage 31". The second way is to change the diameter of the fluid passage 31" by replacing the valve controlling shaft 33" via the sealing O-ring 301". Therefore, by selecting a desire diameter of the fluid passage 31", the valve controlling shaft 33' can be fixed into the valve body 10" to control the flow rate and the volume of water passing therethrough. It is worth mentioning that the actuator 45" can be controlled manual actuation or controlled automatically via a remote control.

In addition, the automate fluid flow control system can be installed into the automated toilet flushing system to control the amount of water to complete the flushing operation. Accordingly, the total amount of flushing water can be controlled by the time of the valve stopper 32" being moved from the closed position to the opened position and back to the closed position as one flushing cycle of the valve stopper 32". The longer time the valve stopper 32" is stayed at the opened position, the larger amount of flushing water is used. However, the diameter of the flush passage 31" will control the flow rate of water during flushing operation.

The automate fluid flow control system can be installed into the faucet system in order to control the flow rate of water and to control the amount of water being used. When the presence of a user is detected, i.e. the hands of the user is located within the detecting area of the sensor, the actuator 45" will be automatically actuated to move the valve stopper 32" from the closed position to the opened position. Due to the smaller diameter of the fluid passage 31", less amount of water will be used for washing the hands of user.

Figure 16:
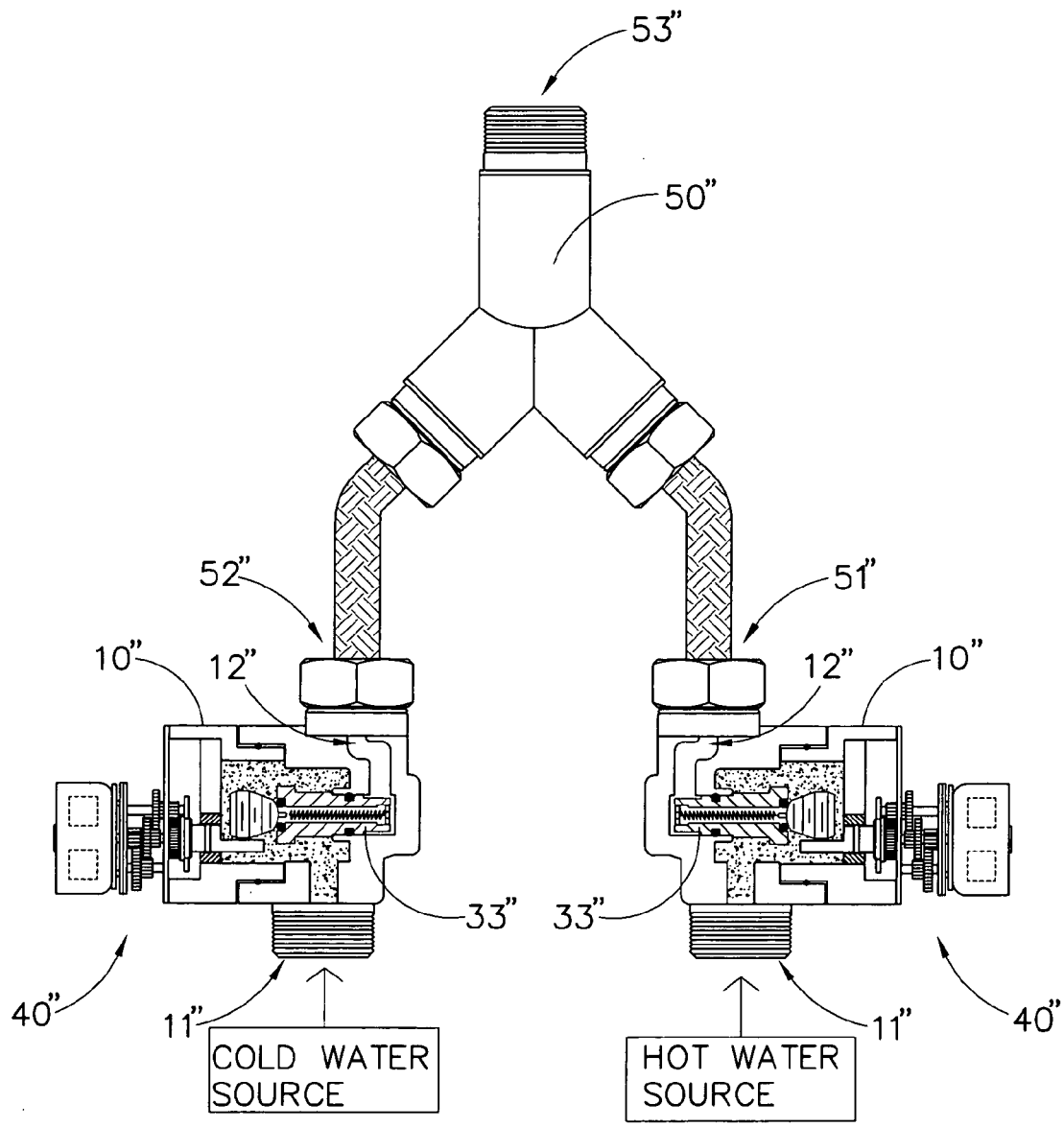
FIG. 16 illustrates two automate fluid flow control system being incorporated with a water faucet system according to the above third preferred embodiment of the present invention.

In addition, more than one automate fluid flow control system can be incorporated with the fluid system, For example, as shown in FIG. 16, two automate fluid flow control systems are used in the faucet system. A Y-shaped water pipe 50" is provided to define a hot water inlet 51", a cold water inlet 52", and a water outlet 53", wherein the two automate fluid flow control systems of the present invention are operatively linked to the hot water inlet 51" and the cold water inlet 52" respectively.

Accordingly, the water outlet 12" of one of the valve bodies 10" is operatively linked to the hot water inlet 51" while the water inlet 11" of the respective valve body 10" is operatively linked to a hot water source such that the respective one automate fluid flow control system forms a hot water flow control of the fluid system. Likewise, the water outlet 12" of another valve body 10" is operatively linked to the cold water inlet 52" while the water inlet 11" of the respective valve body 10" is operatively linked to a cold water source such that the respective one automate fluid flow control system forms a cold water flow control of the fluid system. Therefore, when the valve stopper 32" of the hot water fluid control is actuated to the opened position, hot water is guided to flow from the hot water source to the water outlet 53" through the hot water fluid control. When the valve stopper 32" of the cold water fluid control is actuated to the opened position, cold water is guided to flow from the cold water source to the water outlet 53" through the cold water fluid control. When both the valve stoppers 32" of the hot and cold water fluid controls are actuated to the opened positions, hot and cold water are guided to flow from the hot and cold water sources to the water outlet 53" through the hot and cold water fluid controls in order to mix the hot water with cold water at the water outlet 53". In other words, the user is able to control hot water and cold water individually via the automate fluid flow control systems.

Figure 17:
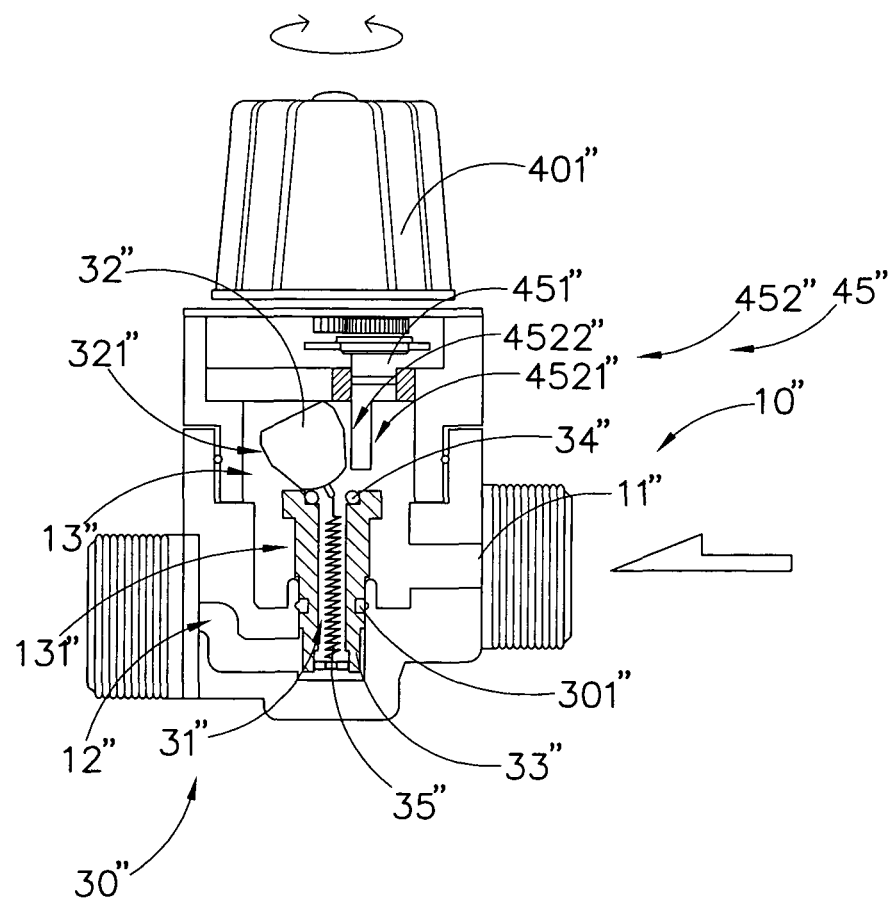
FIG. 17 illustrates an alternative mode of the powering assembly of the automate fluid flow control system according to the above third preferred embodiment of the present invention.

The automate fluid flow control system can also be installed into the faucet system with manual knob 401", as shown in FIG. 17. When the manual knob 401" is rotated, the actuator 45" will be driven to rotate in order to move the valve stopper 32" from the closed position to the opened position. When the manual knob 401" is rotated back to its original position, the actuator 45" will be driven to rotate in order to move the valve stopper 32" back to the closed position from the opened position.

It is worth mentioning that automate fluid flow control system can be installed into different fluid system by selecting the corrected valve controlling shaft 33". In other words, the valve controlling shaft 33" is replaceable to selectively adjust the diameter of the fluid passage 31". For automated toilet flushing system, it is appreciated that a larger diameter of fluid passage 31" will be used. For faucet system, it is appreciated that a smaller diameter of fluid passage 31" will be used. However, the same size of valve body 10" can be installed into both automated toilet flushing system and faucet system. The only difference of the automate fluid flow control system for use in between the automated toilet flushing system and faucet system is the valve controlling shafts 33" with different sizes of flush passage 31". In other words, after the valve body 10" is installed into the fluid system, the valve controlling shaft 33" with the corrected diameter of fluid passage 31" can be coupled within the valve body 10" via the sealing O-ring 301". If the user wants to increase the flow rate of the fluid, he or she can replace the old valve controlling shaft 33" with a new valve controlling shaft 33" without disassembling the valve body 10". In other words, the valve controlling shaft 33" with a smaller diameter of fluid passage 31' is removed from the valve body 10" and is replaced by the valve controlling shaft 33" with a larger diameter of fluid passage 31'. Since there is no diaphragm coupled within the fluid chamber 13" to adjust the fluid pressure therewithin, the valve controlling shaft 33" will not be moved normally in up- and down direction or unwanted lateral movement due to the popping motion of the diaphragm. Therefore, no distortion part is installed into the automate fluid flow control system of the present invention so as to prolong the service life span of the automate fluid flow control system and to prevent any fluid leakage due to the broken diaphragm.

It is appreciated that the automate fluid flow control system is defined as an upright orientation only for illustrative purpose that the valve stopper 32" is sat at the passage opening of the fluid passage 31". However, the automate fluid flow control system can be set at any orientation since the valve stopper 32" will normally seal the fluid passage 31" and will be moved by the actuator 45" between the opened position and the closed position. As shown in FIG. 16, the automate fluid flow control system is set at horizontal orientation to incorporate with the water faucet system.

Figure 18A:
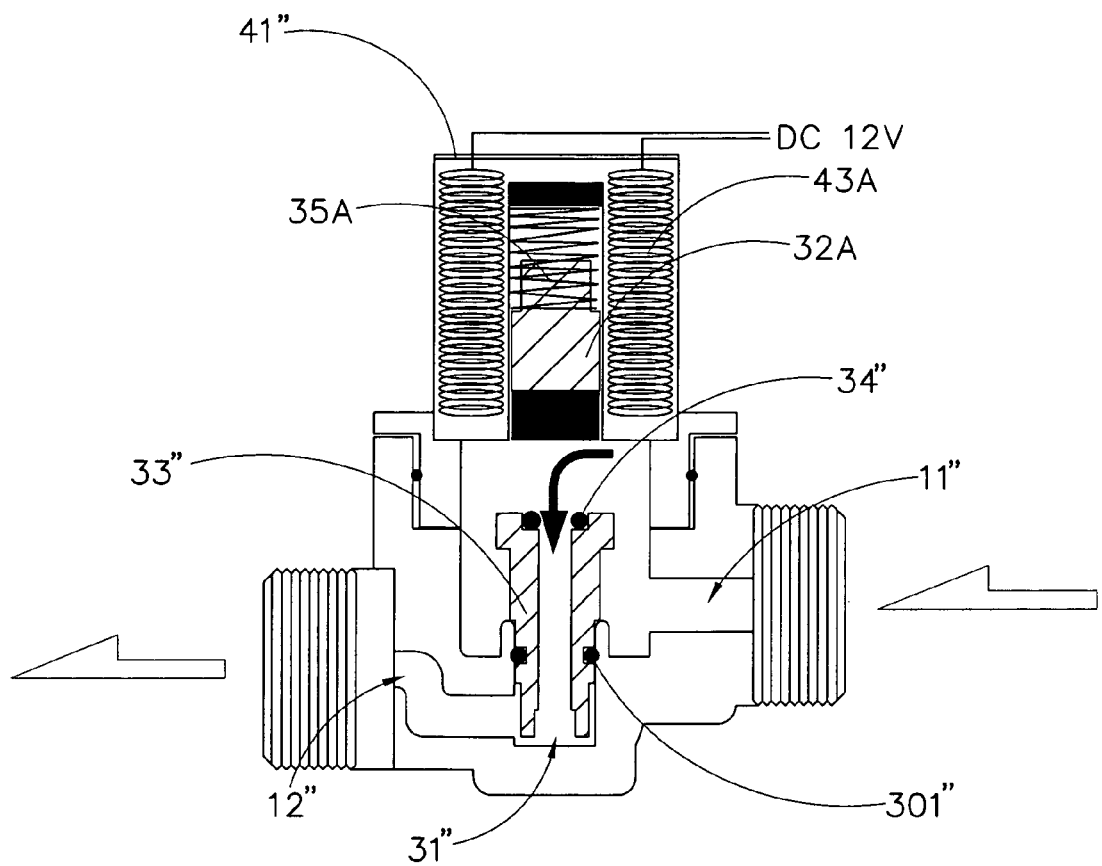
FIGS. 18A and 18B illustrates an alternative mode of the valve stopper of the automate fluid flow control system according to the above third preferred embodiment of the present invention.
Figure 18B:
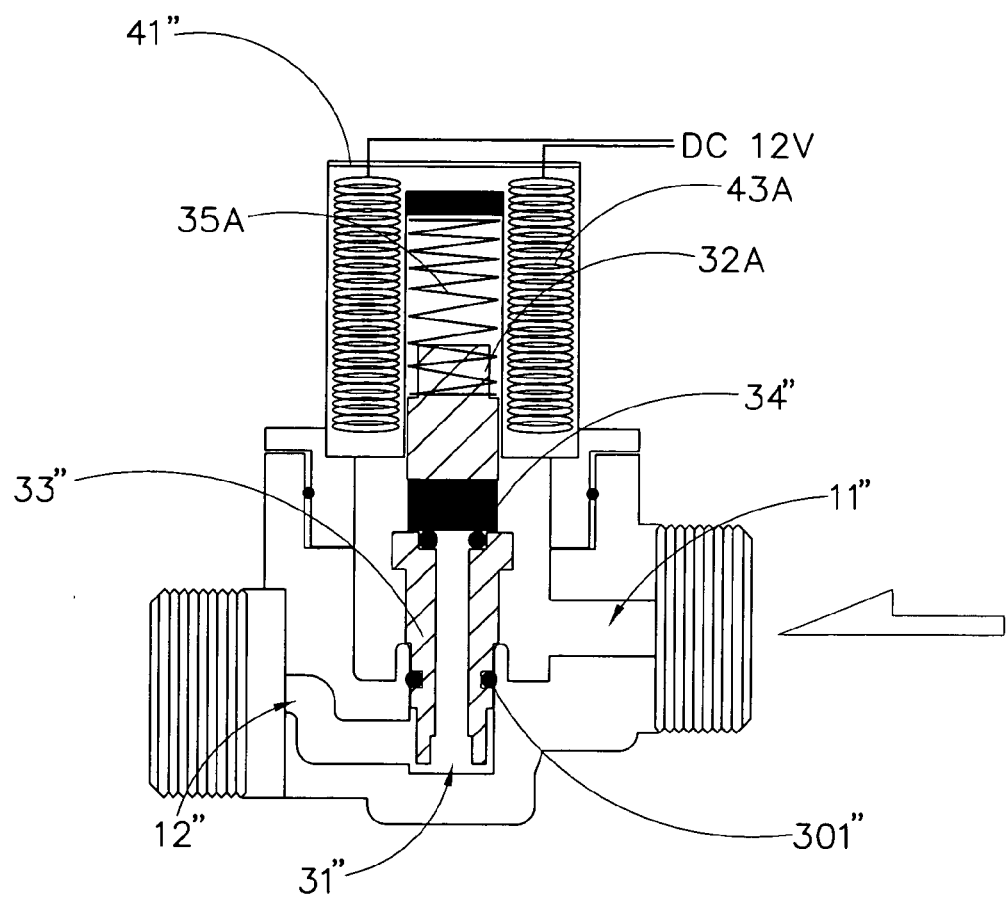

FIGS. 18A and 18B illustrate an alternative mode of the valve stopper 32A is an elongated member alignedly extended toward the passage opening of the fluid passage 31", wherein the valve stopper 32A is driven to alignly move at the passage opening of fluid passage 31" to close the fluid passage 31" for blocking the fluid passing to the fluid outlet 12" at the closed position as shown in FIG. 18B. At the opened position, as shown in FIG. 18A, the valve stopper 32A is moved away from the passage opening of the fluid passage 31" to unseal the fluid passage 31' to allow the fluid passing to the fluid outlet 12".

The power generator 43A, as shown in FIGS. 18A and 18B, is a solenoid power generator wherein the power generator 43A comprises a wound coil for producing a magnetic field when an electric current is passed through the wound coil. Accordingly, the valve stopper 32A is driven to move by the magnetic field produced by the power generator 43A. When the magnetic field is produced, the valve stopper 32A is lifted up to unseal the passage opening of the fluid passage 31" as shown in FIG. 18A. When there is no magnetic field, the valve stopper 32A is dropped down to seal at the passage opening of the fluid passage 31", as shown in FIG. 18B.

The valve stopper 32A is coaxially aligned with the fluid passage 31", wherein the valve stopper 32A has a sealing end to seal at the passage opening of the fluid passage 31" at the closed position. In other words, when the sealing end of the valve stopper 32A is moved away from the passage opening of the fluid passage 31", the fluid passage 31" is unsealed to allow the fluid passing to the fluid outlet 12". Preferably, a sealing element, such as a rubber stopper, is provided at the sealing end of the valve stopper 32A to enhance the sealing effect at the passage opening of the fluid passage 31".

Preferably, the valve stopper 32A is driven to move at a vertical direction along the axis of the fluid passage 31". The sealing end of the valve stopper 32A is defined at a bottom end thereof. Therefore, when the valve stopper 32A is driven to move downwardly, the sealing end of the valve stopper 32A is moved to seal at the passage opening of the fluid passage 31". When the valve stopper 32A is driven to move upwardly, the sealing end of the valve stopper 32A is moved away from the passage opening of the fluid passage 31" so as to unseal the fluid passage 31".

The resilient element 35A is coupled with the valve stopper 32A for applying an urging force against the valve stopper 32A so as to retain the valve stopper 32A at the closed position. According to the preferred embodiment, the resilient element 35A is a compression spring coupled with the upper end of the valve stopper 32A for applying the urging force against the valve stopper 32A so as to normally push the sealing end of the valve stopper 32A at the passage opening of the fluid passage 31". The resilient element 35" has a biasing end coupling with the upper end of the valve stopper 32" and an opposed affixing end coupled with the inner wall of the housing 41" to push the sealing end of the valve stopper 32" at the passage opening of the fluid passage 31" so as to block the fluid passing therethrough. It is worth to mention that when the magnetic field is produced, the valve stopper 32A is lifted up to compress the resilient element 35A and to unseal the passage opening of the fluid passage 31". When there is no magnetic field, the valve stopper 32A is pushed by restoring force of the resilient element 35A to seal the passage opening of the fluid passage 31".

Figure 19:
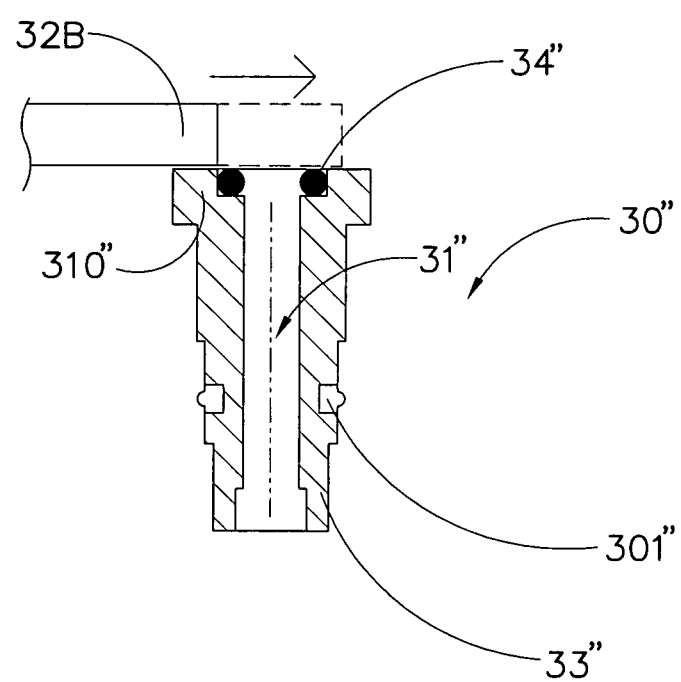
FIG. 19 illustrates another alternative mode of the valve stopper of the automate fluid flow control system according to the above third preferred embodiment of the present invention.

FIG. 19 illustrates another alternative mode of the valve stopper 32B, wherein the valve stopper 32B is driven to move at the passage opening of fluid passage 31" to close the fluid passage 31" for blocking the fluid passing to the fluid outlet 12" at the closed position. At the opened position, the valve stopper 32B is moved away from the passage opening of the fluid passage 31" to unseal the fluid passage 31' to allow the fluid passing to the fluid outlet 12".

Accordingly, the valve stopper 32B is slidably retained at the sealing platform 310" to move between the closed position and the opened position. In other words, the valve stopper 32B is sidewardly moved to seal at the passage opening of the fluid passage 31" at the closed position.

The valve stopper 32B has a sealing end portion to seal at the passage opening of the fluid passage 31" at the closed position. In other words, when the sealing end portion of the valve stopper 32B is moved away from the passage opening of the fluid passage 31", the fluid passage 31" is unsealed to allow the fluid passing to the fluid outlet 12". Accordingly, the valve stopper 32B is driven to move at a horizontal direction perpendicular to the axis of the fluid passage 31". The sealing end portion of the valve stopper 32A is defined at an end portion thereof. Therefore, when the valve stopper 32B is driven to move sidewardly, the sealing end portion of the valve stopper 32B is moved to seal at the passage opening of the fluid passage 31". When the valve stopper 32B is driven to sidewardly move at an opposite direction, the sealing end portion of the valve stopper 32B is moved away from the passage opening of the fluid passage 31" so as to unseal the fluid passage 31".

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An automate fluid flow control system for a fluid system having a fluid inlet, a fluid outlet, and a fluid chamber communicating between said fluid inlet and said fluid outlet, wherein said automate fluid flow control system comprises:
   a relief valve adapted for being sealedly disposed within said fluid chamber for sealing a flow of fluid flowing from said fluid inlet to said fluid outlet, wherein said relief valve has a fluid passage defining a passage opening with a diameter smaller than a diameter of said fluid chamber for controlling a flow rate of fluid passing from said fluid chamber to said fluid outlet, and comprises a valve stopper sitting on said passage opening of said fluid passage to sealedly close said fluid passage for controlling said fluid flowing from said fluid chamber to said fluid outlet;
   a power generator, wherein said valve stopper is moved between a closed position and an opened position through an actuation of said power generator; and
   an actuator operatively driven by said power generator, wherein said actuator comprises a driving arm movably extended from said power generator towards said fluid passage and a pusher arm non-coaxially extended from said driving arm to said valve stopper such that when said driving arm is driven to be moved by said power generator, said pusher arm is driven to correspondingly move to move said valve stopper from said closed position to said opened position, wherein at said closed position of said valve stopper, said valve stopper is sealedly retained to close said fluid passage for blocking said fluid passing to said fluid outlet, and at said opened position of said valve stopper, said actuator drives said valve stopper to unseal said fluid passage for allowing said fluid passing to said fluid outlet through said fluid passage; wherein said valve stopper has an engaging surface arranged in such a manner that when said actuator is moved, said actuator pushes at said engaging surface of said valve stopper to move said valve stopper from said closed position to said opened position; wherein said relief valve further comprises a resilient element, which is disposed within said fluid passage, having a biasing end coupling with said valve stopper and an opposed affixing end coupled with a bottom opening end of said fluid passage for applying an urging force against said valve stopper so as to retain said valve stopper at said closed position.

2. The automate fluid flow control system, as recited in claim 1, wherein said relief valve further comprises a valve controlling shaft having a tubular structure and defining said fluid passage therealong, wherein said valve controlling shaft is immovably sealed at said fluid chamber to prevent a relative movement of said valve controlling shaft with respect to said fluid chamber.

3. The automate fluid flow control system, as recited in claim 2, wherein said relief valve further comprises a sealing O-ring sealed around an outer surrounding wall of said valve controlling shaft for sealing and coupling within said fluid chamber.

4. The automate fluid flow control system, as recited in claim 3, wherein said relief valve further comprises a sealing platform formed on top of said valve controlling shaft to define said passage opening of said fluid passage at said sealing platform, and a sealing ring provided at said sealing platform around said passage opening of said fluid passage, wherein said valve stopper is sat on said sealing ring to seal at said passage opening of said fluid passage.

* * * * *